(12) United States Patent
Sasaki et al.

(10) Patent No.: US 8,727,634 B2
(45) Date of Patent: May 20, 2014

(54) OPTICAL CONNECTOR, OPTICAL CONNECTING STRUCTURE AND METHOD OF MANUFACTURING OPTICAL CONNECTOR

(75) Inventors: Dai Sasaki, Yokohama (JP); Tomomi Sano, Yokohama (JP); Akira Inoue, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/523,419

(22) Filed: Jun. 14, 2012

(65) Prior Publication Data

US 2012/0328244 A1 Dec. 27, 2012

(30) Foreign Application Priority Data

Jun. 17, 2011 (JP) ................. P2011-135216
Apr. 2, 2012 (JP) ................. P2012-084183
Apr. 20, 2012 (JP) ................. P2012-096905

(51) Int. Cl.
*G02B 6/38* (2006.01)

(52) U.S. Cl.
USPC ............................. 385/59; 385/71

(58) Field of Classification Search
USPC .................................... 385/59, 71
See application file for complete search history.

(56) References Cited

U.S. PATENT DOCUMENTS

| 6,402,389 | B1* | 6/2002 | Steijer et al. | 385/65 |
| 2003/0179993 | A1* | 9/2003 | Shigenaga et al. | 385/33 |
| 2008/0069504 | A1* | 3/2008 | Hiraga et al. | 385/106 |

FOREIGN PATENT DOCUMENTS

| JP | 62-47604 | 3/1987 |
| JP | 62-226107 | 10/1987 |
| JP | 4-249205 | 9/1992 |
| JP | 5-341147 | 12/1993 |
| JP | 10-104443 | 4/1998 |
| JP | 2007-279194 | 10/2007 |

* cited by examiner

*Primary Examiner* — Omar Rojas
(74) *Attorney, Agent, or Firm* — Drinker Biddle & Reath LLP

(57) ABSTRACT

An optical connecting member realizes an optical connecting between a multi-core fiber and a plurality of single-core fibers by a waveguide part which connects a first end face and a second end face. With the optical connecting member, a connected end which is connected to the first end face is a straight-line portion that is orthogonal to the first end face in each of the plurality of waveguide parts. In addition, a diverged end which is diverged to the second end face is a straight-line portion that is orthogonal to the second end face. Consequently, light that has passed through the waveguide parts is emitted from the first end face and the second end face substantially perpendicularly to the faces, thereby enabling optical connecting loss to be favorably inhibited.

15 Claims, 26 Drawing Sheets

Fig.17
(a)
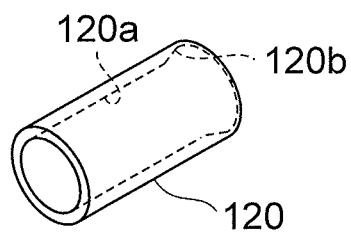
(b)
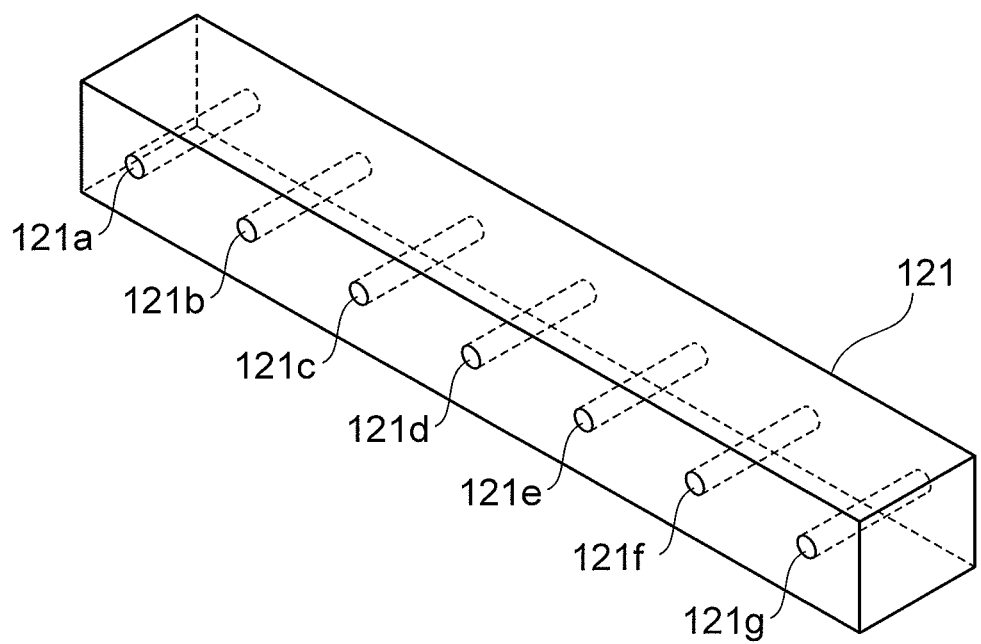

Fig.24
(a)
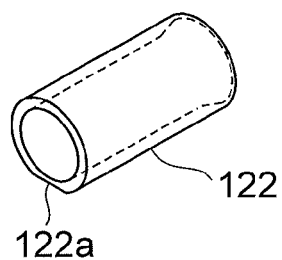
(b)
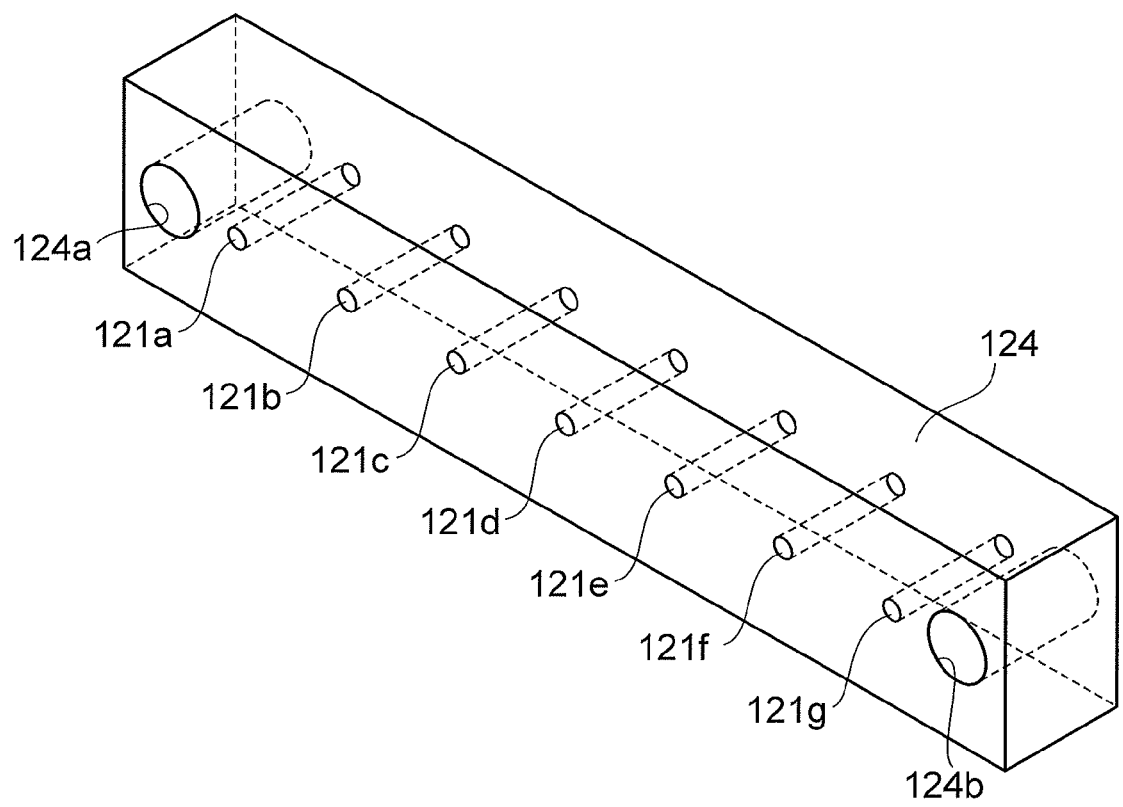

OPTICAL CONNECTOR, OPTICAL CONNECTING STRUCTURE AND METHOD OF MANUFACTURING OPTICAL CONNECTOR

TECHNICAL FIELD

The present invention relates to an optical connecting member for efficiently connecting an optical component such as a plurality of single-core fibers to an optical element such as a multi-core fiber which can be suitably applied to an optical communication system, as well as to an optical connecting structure of the foregoing optical connecting member and a method of manufacturing the foregoing optical connecting member.

BACKGROUND ART

Conventionally, in order to provide the fiber to the home (FTTH) service which enables the optical communication between one transmitter station and a plurality of subscribers, a so-called passive optical network (PON) system in which the respective subscribers share one optical fiber by interposing a multiple-stage optical splitter has been realized. Nevertheless, the PON system entails technical problems such as congestion control and securement of a receiver dynamic range against the increase in transmission capacity in the future.

As one means for resolving the foregoing technical problems, migration to the single star (SS) system can be considered. Upon migrating to the SS system, since the number of fiber cores will increase on the station side in comparison to the PON system, realization of ultrafine and ultrahigh density optical cables is essential on the station side. As optical fibers for achieving such ultrafine and ultrahigh density optical cables, for instance, preferably used may be a multi-core fiber comprising a plurality of cores in a single clad.

As such multi-core fiber, for instance, the optical fiber disclosed in Patent Literature 1 includes seven or more cores disposed two-dimensionally in the cross section thereof. Moreover, for instance, Patent Literature 2 discloses an optical fiber in which a plurality of cores are arranged in parallel in a straight line, and describes that the connecting of the optical waveguide part and the semiconductor optical integrated element is facilitated.

CITATION LIST

Patent Literature

Patent Literature 1: Japanese Unexamined Patent Application Publication No. H05-341147
Patent Literature 2: Japanese Unexamined Patent Application Publication No. H10-104443

SUMMARY OF INVENTION

Technical Problem

Nevertheless, the actual condition is that a network resource; for instance, standard optical equipment or the like, which is envisioned as the object to be connected to the foregoing multi-core fiber having a plurality of cores, is configured on the premise of being connected to the station via a single-core fiber. Thus, the connecting configuration of the multi-core fiber and a plurality of single-core fibers is important, and optical connecting means having a simple configuration and capable of inhibiting connecting loss is being demanded.

The present invention was devised in order to resolve the foregoing problems, and an object of this invention is to provide an optical connecting member capable of efficiently connecting, with a simple configuration, an optical element such as a multi-core fiber having a plurality of cores, and an optical component such a plurality of single-core fibers, and an optical connecting structure for connecting the foregoing optical connecting member and an optical element or the like.

Solution to Problem

In order to achieve the foregoing object, the optical connecting member according to the first aspect of the present invention is an optical connecting member for connecting an optical element including a plurality of optical input/output (I/O) parts respectively having optical axes that are parallel to each other, to other optical component, and comprises a main body part having a first end on the optical element side and a second end on the other optical component side, and a plurality of waveguide parts disposed in the main body part and extending so as to connect the first end and the second end. With this optical connecting member, the plurality of waveguide parts are arrayed so as to correspond to an array of the plurality of optical I/O parts and respectively have straight-line portions which are parallel to each other at the first end.

The optical connecting member according to this first aspect realizes the optical connecting between an optical element such as a multi-core fiber and an optical component such as a plurality of single-core fibers by using a waveguide part which connects a first end and a second end. With this optical connecting member, the plurality of waveguide parts are arrayed so as to correspond to an array of the plurality of optical I/O parts and respectively have straight-line portions which are parallel to each other at the first end. Consequently, since the optical axis of the plurality of waveguide parts becomes parallel to each other on the first end side, the optical axis of the optical connecting member and the optical axis of the optical element such as a multi-core fiber can be matched easily, and optical connecting loss can be favorably inhibited. Moreover, with this optical connecting member, since each of the plurality of waveguide parts comprises a region which becomes parallel to each other on the first end side, it is possible to maintain the parallelism of the waveguide parts even in cases where the connecting face of the optical connecting member is polished to a certain degree in order to obtain a favorable connecting face.

With the optical connecting member according to the foregoing first aspect, the plurality of waveguide parts may be arrayed two-dimensionally so as to correspond to a two-dimensional array of the plurality of optical I/O parts at the first end.

With the optical connecting member according to the foregoing first aspect, the plurality of waveguide parts may arrayed one-dimensionally so as to correspond to an array of the other optical component and respectively have straight-line portions which are parallel to each other at the second end. In the foregoing case, since the optical axis of the plurality of waveguide parts becomes parallel to each other on the second end side, the optical axis of the optical connecting member and the optical axis of the optical component such as a plurality of single-core fibers can be easily matched, and optical connecting loss can be favorably inhibited. Moreover, with this optical connecting member, since each of the plurality of waveguide parts comprises a region which becomes parallel to each other on the second end side, it is possible to maintain the parallelism of the waveguide parts even in cases where the connecting face of the optical connecting member is polished to a certain degree in order to obtain a favorable connecting face.

With the optical connecting member according to the foregoing first aspect, the main body part may include a plurality of through-holes having an inner diameter which is substantially equal to an outer diameter of each of the plurality of waveguide parts, and the plurality of waveguide parts may be respectively housed and fixed in the plurality of through-holes. In the foregoing case, the plurality of waveguide parts may be respectively formed of a single-core fiber having a cladding diameter which is equal to a distance between the plurality of optical I/O parts. For example, when the optical element is a multi-core fiber, the core array of the multi-core fiber is normally formed so that the inter-core distance becomes equal. Accordingly, based on the foregoing configuration, a first end in which the waveguide parts are arrayed similar to the core array of the multi-core fiber can be easily obtained.

With the optical connecting member according to the foregoing first aspect, the plurality of waveguide parts may also be respectively formed by filling a fluid, which has a higher refractive index than the main body part, in the plurality of through-holes formed in the main body part. Moreover, the plurality of waveguide parts may also be each formed by coating an optical reflective film on an inner wall of each of the plurality of through-holes formed in the main body part. In both of the foregoing cases, waveguide parts with inhibited optical connecting loss can be easily configured.

With the optical connecting member according to the foregoing first aspect, the first end may have a cylindrical shape. In the foregoing case, upon fixing the optical element such as a multi-core fiber to a general-purpose cylindrical ferrule, an end face of the optical element such as a multi-core fiber and an end face of the optical connecting member can be easily connected via a sleeve. Moreover, the second end may be provided with a guide part for connecting to the other optical component so that an optical axis of the other optical component and an optical axis of each of the plurality of waveguide parts at the second end coincide with each other.

With the optical connecting member according to the foregoing first aspect, end faces of the waveguide parts may be arrayed at regular intervals at the first end. In the foregoing case, for example, when the optical element is a multi-core fiber, the core array of the multi-core fiber is normally configured as a two-dimensional array so that the inter-core distance becomes equal. Accordingly, the connecting of the multi-core fiber is facilitated by forming the first end configured as described above.

Moreover, in order to achieve the foregoing object, the optical connecting member according to the first aspect of the present invention is an optical connecting member for connecting a multi-core fiber having a plurality of cores, and a plurality of single-core fibers, and comprises a main body part including a first end face which is connected to an end face of the multi-core fiber, a second end face which is diverged to the plurality of single-core fibers, and a plurality of waveguide parts which extend so as to connect the first end face and the second end face. With this optical connecting member, each of the plurality of waveguide parts is a straight-line portion in which at least an end connected with the first end face is orthogonal to the first end face.

This optical connecting member realizes the optical connecting between a multi-core fiber and a plurality of single-core fibers by using a waveguide part which connects a first end face and a second end face. With this optical connecting member, each of the plurality of waveguide parts is a straight-line portion in which at least an end connected with the first end face is orthogonal to the first end face. Consequently, light that has passed through the waveguide parts is emitted from the first end face and the second end face substantially perpendicularly to the faces, and thereby it is possible to easily match the optical axis of the multi-core fiber and the plurality of single-core fibers at the connecting part, and favorably inhibit optical connecting loss.

Moreover, in order to achieve the foregoing object, the optical connecting member according to the second aspect of the present invention is an optical connecting member for connecting an optical element including a plurality of optical I/O parts respectively having optical axes that are parallel to each other, to other optical component, and comprises a main body part having a first end on the optical element side and a second end on the other optical component side, a plurality of waveguide parts disposed in the main body part and extending so as to connect the first end and the second end, and a first fixing component for retaining one end of each of the plurality of waveguide parts at the first end. With this optical connecting member, the first fixing component internally fixes the plurality of waveguide parts so that the plurality of waveguide parts are parallel to each other.

The optical connecting member according to this second aspect realizes the optical connecting between an optical element such as a multi-core fiber and an optical component such as a plurality of single-core fibers by using a waveguide part which connects a first end and a second end. With this optical connecting member, the first fixing component fixes the plurality of waveguide parts so that the plurality of waveguide parts are parallel to each other on the first end side. Consequently, since the optical axis of the plurality of waveguide parts becomes parallel to each other on the first end side, the optical axis of the optical connecting member and the optical axis of the optical element such as a multi-core fiber can be matched easily, and optical connecting loss can be favorably inhibited. Moreover, with this optical connecting member, since each of the plurality of waveguide parts comprises a region which becomes parallel to each other on the first end side, it is possible to maintain the parallelism of the waveguide parts even in cases where the connecting face of the optical connecting member is polished to a certain degree in order to obtain a favorable connecting face.

With the optical connecting member according to the foregoing second aspect, the first fixing component may fix the plurality of waveguide parts so that the plurality of waveguide parts are arrayed two-dimensionally at the first end. In the foregoing case, it is easy to cause the array of the optical I/O parts of an optical element such as a multi-core fiber, which is normally configured in a two-dimensional array, and the array of the waveguide parts of the optical connecting member to correspond.

With the optical connecting member according to the foregoing second aspect, the first fixing component may include a guide part for connecting to the optical element so that an optical axis of each of the plurality of optical I/O parts of the optical element and an optical axis of one end of each of the plurality of waveguide parts coincide with each other. In the foregoing case, since the first fixing component for fixing the waveguide parts includes a guide part for matching the optical axes, the optical axis of the optical element and the optical axis of the waveguide parts can be easily matched.

The optical connecting member according to the foregoing second aspect may further comprise a second fixing component for retaining another end of each of the plurality of waveguide parts at the second end. In the foregoing case, the second fixing component fixes the plurality of waveguide parts at the second end so that the plurality of waveguide parts are parallel to each other. Consequently, since the optical axis of the plurality of waveguide parts becomes parallel to each other also on the second end side, the optical axis of the optical connecting member and the optical axis of the optical element such as a plurality of single-core fibers can be matched easily, and optical connecting loss can be favorably inhibited. Moreover, with this optical connecting member, since each of the plurality of waveguide parts comprises a region which becomes parallel to each other on the second end side, it is possible to maintain the parallelism of the waveguide parts even in cases where the connecting face of the optical connecting member is polished to a certain degree in order to obtain a favorable connecting face.

With the optical connecting member according to the foregoing second aspect, the second fixing component may fix the plurality of waveguide parts so that the plurality of waveguide parts are arrayed one-dimensionally at the second end. In the foregoing case, it is easy to cause the array of the optical I/O parts of an optical component such as a plurality of single-core fibers, which is normally configured in a one-dimensional array, and the array of the waveguide parts of the optical connecting member to correspond.

With the optical connecting member according to the foregoing second aspect, the second fixing component may include a guide part for connecting to the other optical component so that an optical axis of the other optical component and an optical axis of another end of each of the plurality of waveguide parts coincide with each other. In the foregoing case, since the second fixing component for fixing the waveguide parts includes a guide part for matching the optical axes, the optical axis of the optical component and the optical axis of the waveguide parts can be easily matched.

With the optical connecting member according to the foregoing second aspect, the first or second fixing component may be a component for use in insert molding. In the foregoing case, it is possible to easily produce an optical connecting member in which the positioning of the first or second fixing component in the main body part has been performed with precision.

With the optical connecting member according to the foregoing second aspect, the waveguide parts may be each formed of a single-core fiber having a cladding diameter which is equal to a distance between the plurality of optical I/O parts of the optical element. The core array of an optical element such as a multi-core fiber is normally formed so that the inter-core distance becomes equal. Accordingly, based on the foregoing configuration, waveguide parts which are arrayed in the same manner as the core array of the optical element such as a multi-core fiber can be easily obtained.

With the optical connecting member according to the foregoing second aspect, an end face on the first end side may have a substantial circular shape. In the foregoing case, upon fixing the optical element such as a multi-core fiber to a general-purpose cylindrical ferrule, an end face of the optical element such as a multi-core fiber and the first end of the optical connecting member can be easily connected via a sleeve.

With the optical connecting member according to the foregoing second aspect, end faces of the waveguide parts may be arrayed at regular intervals at the first end. The core array of the optical element such as a multi-core fiber is normally configured as a two-dimensional array so that the inter-core distance becomes equal. Accordingly, the connecting with an optical element such as the multi-core fiber is facilitated by comprising the first end configured as described above.

Moreover, in order to achieve the foregoing object, the optical connecting structure according to the present invention comprises any one of the optical connecting members described above, and an optical element which includes a plurality of optical I/O parts respectively having optical axes that are parallel to each other, and which is connected to the optical connecting member. With this optical connecting structure, the optical element is connected to the optical connecting member so that the plurality of waveguide parts of a first end face on the optical element side of the first end and the plurality of optical I/O parts of the optical element face each other. In the foregoing case, the plurality of optical I/O parts of the optical element may be disposed in point symmetry around a predetermined rotating axis, and connected by adjusting a rotating angle so as to face the plurality of waveguide parts at the first end face. Consequently, the optical element and the optical connecting member can be easily connected.

With the foregoing optical connecting structure, the optical element is a multi-core fiber in which a plurality of cores are surrounded by a common clad, and the multi-core fiber may be retained by an optical ferrule which is fixed by being positioned relative to the optical connecting member by a guide member. In the foregoing case, a restrictive structure for restricting a rotating angle of the multi-core fiber may be provided in the multi-core fiber and the optical ferrule. Consequently, the positioning of the multi-core fiber and the optical connecting member in the rotating direction is facilitated.

With the foregoing optical connecting structure, the optical element is a receiving/emitting element in which a plurality of light receiving/emitting parts are arrayed two-dimensionally, and the optical connecting structure may further comprise a light collection optical system for optically connecting each of the plurality of light receiving/emitting parts of the receiving/emitting element to the plurality of waveguide parts. In the foregoing case, a receiving/emitting element comprising a plurality of light receiving/emitting parts such as with VCSEL can be connected to other optical component upon favorably inhibiting connecting loss.

Moreover, the present invention may also be viewed as a method of manufacturing, via insert molding, the optical connecting member according to the foregoing second aspect. In other words, the manufacturing method of an optical connecting member according to the present invention comprises a step of preparing a plurality of waveguide parts for configuring the optical connecting member and a fixing component for use in insert molding, a step of retaining, in the fixing component, one end of each of the plurality of waveguide parts so that the plurality of waveguide parts becomes parallel to each other, a step of disposing, in a mold, the fixing component and the plurality of waveguide parts each having one end that has been retained by the fixing component, and a step of pouring a predetermined molding material in the mold to perform insert molding.

With this manufacturing method of an optical connecting member, provided is a step of retaining, in the fixing component, one end of each of the plurality of waveguide parts so that the plurality of waveguide parts becomes parallel to each other. The plurality of waveguide parts retained in parallel as described above and the fixing component for fixing the plurality of waveguide parts are disposed in a mold and subject to insert molding. In the foregoing case, the optical connecting member is manufactured by each of the plurality of waveguide parts being fixed with the fixing component so as to be parallel to each other. Consequently, with this manufactured optical connecting member, the optical axis of the plurality of waveguide parts becomes parallel to each other. Thus, the optical axis of the optical connecting member and the optical axis of the optical element such as a multi-core fiber or the optical axis of the optical component such as the plurality of single-core fibers can be easily matched, and the optical connecting loss can be favorably inhibited.

Advantageous Effects of Invention

According to the present invention, an optical element including a plurality of optical I/O parts, and other optical component can be efficiently connected with a simple configuration.

BRIEF DESCRIPTION OF DRAWINGS

FIG. 17 is a perspective view showing the fixing component configuring the optical connecting member illustrated in FIG. 13, wherein (a) of FIG. 17 shows the first fixing component disposed on the first end face side, and (b) of FIG. 17 shows the second fixing component disposed on the second end face side;

FIG. 24 is a perspective view showing a modified example of the fixing component configuring the optical connecting member according to the second embodiment, wherein (a) of FIG. 24 shows a modified example of the first fixing component disposed on the first end face side, and (b) of FIG. 24 shows a modified example of the second fixing component disposed on the second end face side;

DESCRIPTION OF EMBODIMENTS

The preferred embodiments of the optical connecting member and the optical connecting structure are now explained in detail with reference to the appended drawings.

First Embodiment

Figure 1:
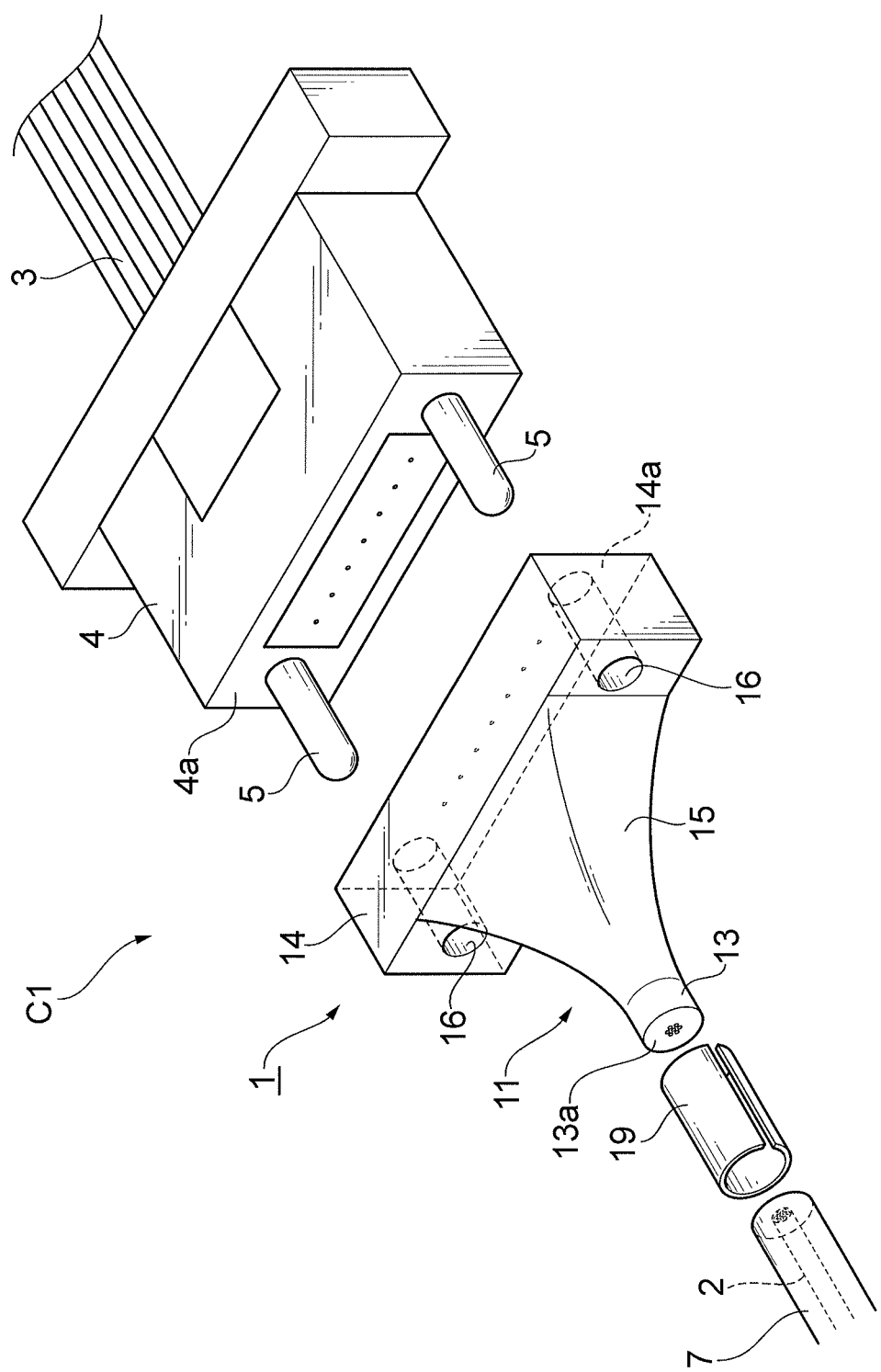
FIG. 1 is a perspective view showing the optical connecting member and the optical connecting structure according to the first embodiment of the present invention.
Figure 2:
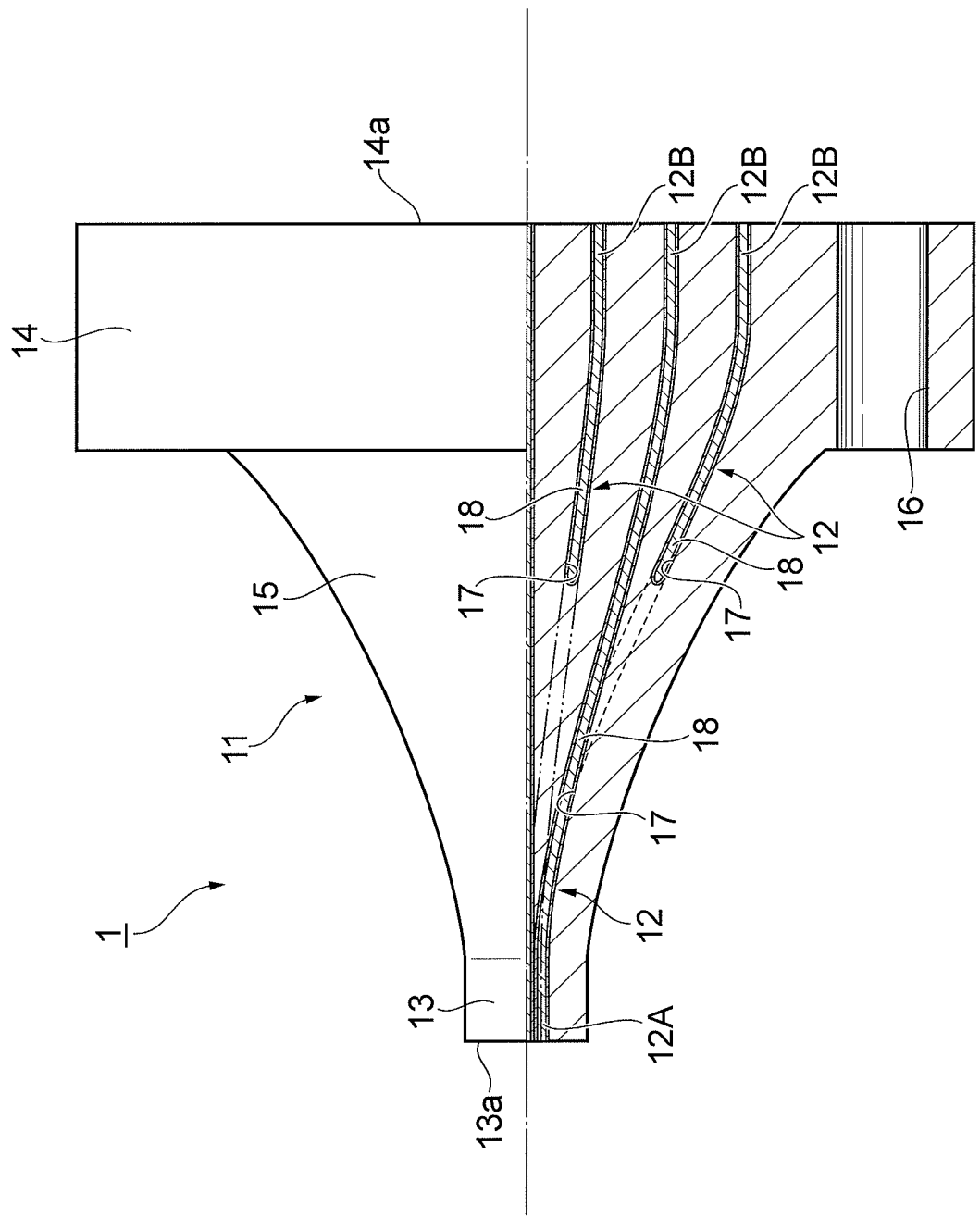
FIG. 2 is a plan view with a part of the optical connecting member illustrated in FIG. 1 broken away.

FIG. 1 is a perspective view showing the optical connecting member and the optical connecting structure using the optical connecting member according to the first embodiment of the present invention. FIG. 2 is a plan view with a part of the optical connecting member illustrated in FIG. 1 broken away. As shown in FIG. 1, an optical connecting member 1 is an optical connecting member for connecting a multi-core fiber (hereinafter referred to as "MCF") 2, and a plurality of single-core fibers (hereinafter referred to as "SCFs") 3. By using the optical connecting member 1, the MCF 2 as one example of the optical element and the SCFs 3 as one example of the optical component are optically connected to configure an optical connecting structure C1.

The MCF 2 is a fiber in which a plurality of cores (optical I/O parts) are disposed in the same clad so that their mutual optical axes become parallel. Preferably, a plurality of cores of the MCF 2 are disposed so that the inter-core distance thereof becomes equal, respectively. While the core array may be linear one-dimensional array, for instance, the core array is preferably a two-dimensional array such as a triangular lattice or square array.

The MCF 2 of this embodiment is of a triangular lattice array, with one core at the center position of the clad and six cores around the center core at 60° intervals; that is, a total of seven cores are disposed at mutually regular intervals. In other words, the cores of the MCF 2 are disposed in point symmetry around the rotating axis which is positioned at the center. For instance, when there is no center core, a precise triangular lattice array is not formed, but the present invention includes an array that realizes a triangular lattice array upon assuming the existence of the center core.

Meanwhile, the SCFs 3 are fibers, having a core of the same diameter as the MCF 2, and in which the cladding diameter of at least the tip portion is reduced so as to become equal to the inter-core distance of the MCF 2. An MT connector 4 is mounted at the tip of the SCFs 3, and the SCFs 3 are fixed by the MT connector so that the optical axis of the tip portion of the SCFs 3 becomes parallel to each other. A tip face 4a of the MT connector 4 is provided with guide pins 5 for mounting the optical connecting member 1, and the tips of seven SCFs 3 are exposed horizontally in one line at a predetermined pitch according to the number of cores of the MCF 2 between the guide pins 5.

The optical connecting member 1 comprises, as shown in FIG. 1 and FIG. 2, a main body part 11 formed from plastic resin such as polyphenylenesulfide (PPS) resin or polyetherimide (PEI) resin which is used for configuring a standard optical connector, and a plurality of (in this example, seven) waveguide parts 12 provided in the main body part 11. The main body part 11 has a first end 13 including a first end face 13a to be connected to an end face of the MCF 2, a second end 14 including a second end face 14a to be connected to an end face of the SCFs 3, and an intermediate part 15 positioned between the first end 13 and the second end 14.

The first end 13 has a cylindrical shape with the same diameter as the outer diameter of a ferrule 7 into which the MCF 2 has been inserted, and the end face thereof is the first end face 13a having a circular cross section. The length of the first end 13 is, for example, 5 times or more of the core diameter of the MCF 2. Meanwhile, the second end 14 is of a substantial hexahedron shape, and the end face thereof is the second end face 14a having the same shape as the tip face 4a of the MT connector 4.

As with the first end 13, the length of the second end 14 is, for example, 5 times or more of the core diameter of the MCF 2. The second end 14 is provided with fitting holes 16 (guide parts) into which the guide pins 5 of the MT connector 4 are fitted. The intermediate part 15 has a shape which spreads toward the bottom from the first end 13 side to the second end 14 side so as to connect the cylindrical first end 13 and the substantially rectangular second end 14.

More specifically, the waveguide part 12 is configured from SCFs 18 tightly disposed (housed) in through-holes 17 extending in the main body part 11 so as to connect the first end face 13a of the first end 13 and the second end face 14a of the second end 14. The through-holes 17 have an inner diameter which is substantially equal to the outer diameter of the SCFs 18. The SCFs 18 are fibers similar to the SCFs 3, and the cladding diameter thereof is reduced so as to become equal to the inter-core distance of the MCF 2.

Each of the plurality of waveguide parts 12 is a straight-line portion in which a connected end 12A which is connected to the first end face 13a is orthogonal to the first end face 13a. The connected end 12A formed from the straight-line portion at the first end 13 of the plurality of waveguide parts 12 is arrayed so as to become parallel to each other. A diverged end 12B which diverges to the second end face 14a is a straight-line portion which is orthogonal to the second end face 14a. The diverged end 12B formed from the straight-line portion at the second end 14 of the plurality of waveguide parts 12 is arrayed so as to become parallel to each other.

The term "orthogonal" as used in this embodiment shows, for example, that the angle relative to the first end face 13a is within a range of 90 degrees±0.5 degrees, but it is obvious to a person skilled in the art that the foregoing range can be increased or decreased as needed according to the connecting precision by the optical connecting member. The length of the connected end 12A and the diverged end 12B is, for example, five times or more of the core diameter of the MCF 2. The intermediate portion of the waveguide part 12 curves gently along the shape of the main body part 11 between the first end face 13a and the second end face 14a, and joins the connected end 12A and the diverged end 12B.

Figure 3:
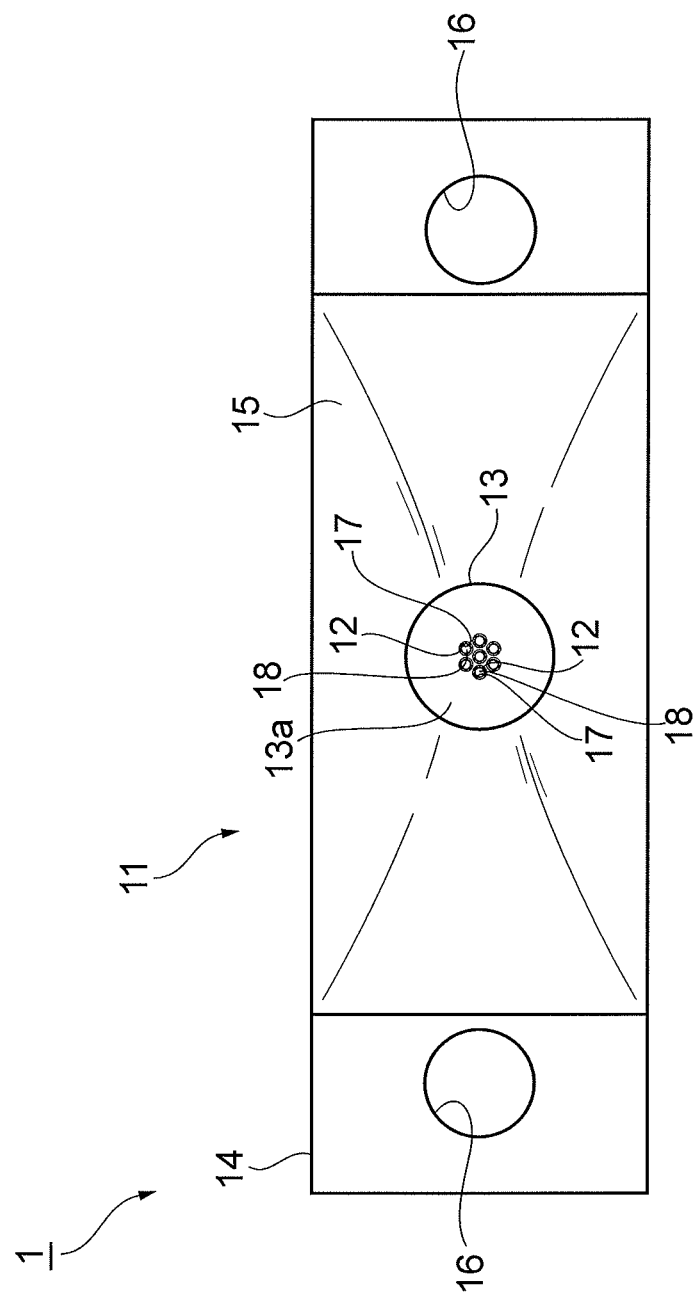
FIG. 3 is a diagram showing the first end face of the main body part of the optical connecting member illustrated in FIG. 1.
Figure 4:
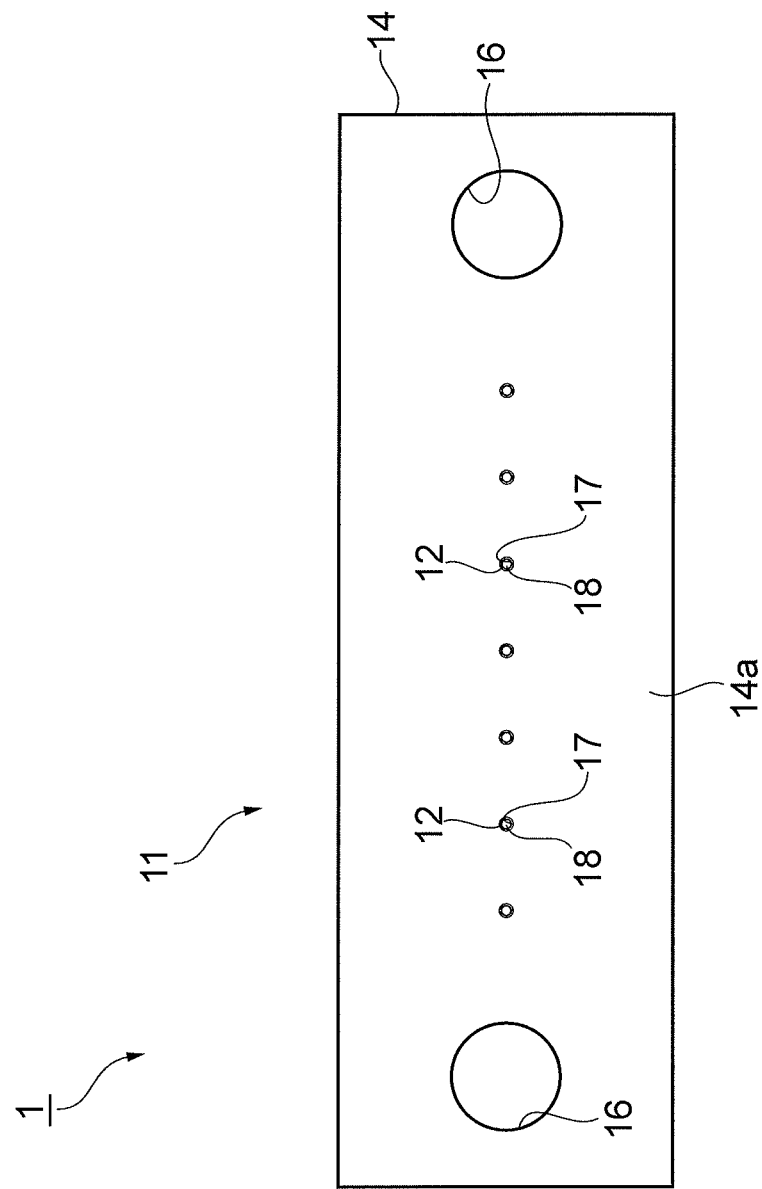
FIG. 4 is a diagram showing the second end face of the main body part of the optical connecting member illustrated in FIG. 1.

One end face of the waveguide part 12 is exposed on the first end face 13a so as to cause the core position of the MCF 2 and the core position of the SCFs 18 to correspond, and, as shown in FIG. 3, one core is disposed at the center position of the first end face 13a and six cores are disposed around the center core at 60° intervals; that is, a total of seven cores are disposed at mutually regular intervals. The other end face of the waveguide part 12 is exposed on the second end face 14a so as to cause the core position of the SCFs 3 and the core position of the SCFs 18 to correspond, and, as shown in FIG. 4, disposed horizontally in one line at a predetermined pitch between the fitting holes 16.

In other words, as shown in FIG. 3, the plurality of waveguide parts 12 are arrayed two-dimensionally so as to correspond to the plurality of cores of the MCF 2 at the connected end 12A thereof (that is, so that the straight lines connecting the cores form a polygon). Meanwhile, as shown in FIG. 4, the plurality of waveguide parts 12 are arrayed one-dimensionally so as to correspond to the plurality of cores of the SCFs 3 at the diverged end 12B thereof (that is, so that the straight lines connecting the cores form a straight line).

With the optical connecting member 1 configured as described above, the end face of the MCF 2 fixed by the ferrule 7 and the first end face 13a of the main body part 11 are caused to come into contact in a split sleeve 19 (guide member) in a state where the core position of the MCF 2 and the position of the waveguide parts 12 on the first end face 13a are matched; that is, in a state where the rotating angle is adjusted so that the cores of the MCF 2 and the waveguide parts 12 on the first end face 13a face each other. In addition, by fitting the guide pins 5 into the fitting holes 16 of the second end 14 and causing the tip face 4a of the MT connector 4 and the second end face 14a of the main body part 11 to come into contact, the MCF 2 and the SCFs 3 can be connected via the waveguide parts 12.

Here, with the optical connecting member 1, in each of the plurality of waveguide parts 12, the connected end 12A which is connected to the first end face 13a is a straight-line portion which is orthogonal to the first end face 13a, and the straight-line portions are parallel to each other. Consequently, the MCF 2 and the optical axis in the connecting part of the waveguide part 12 can be matched easily. The diverged end 12B which diverges to the second end face 14a is a straight-line portion which is orthogonal to the second end face 14a, and the straight-line portions are parallel to each other. Consequently, the waveguide parts 12 and the optical axis in the connecting part of the SCFs 3 can also be matched easily. Accordingly, in comparison to cases where light is emitted obliquely from the first end face 13a and the second end face 14a, optical connecting loss can be inhibited favorably.

Figure 5:
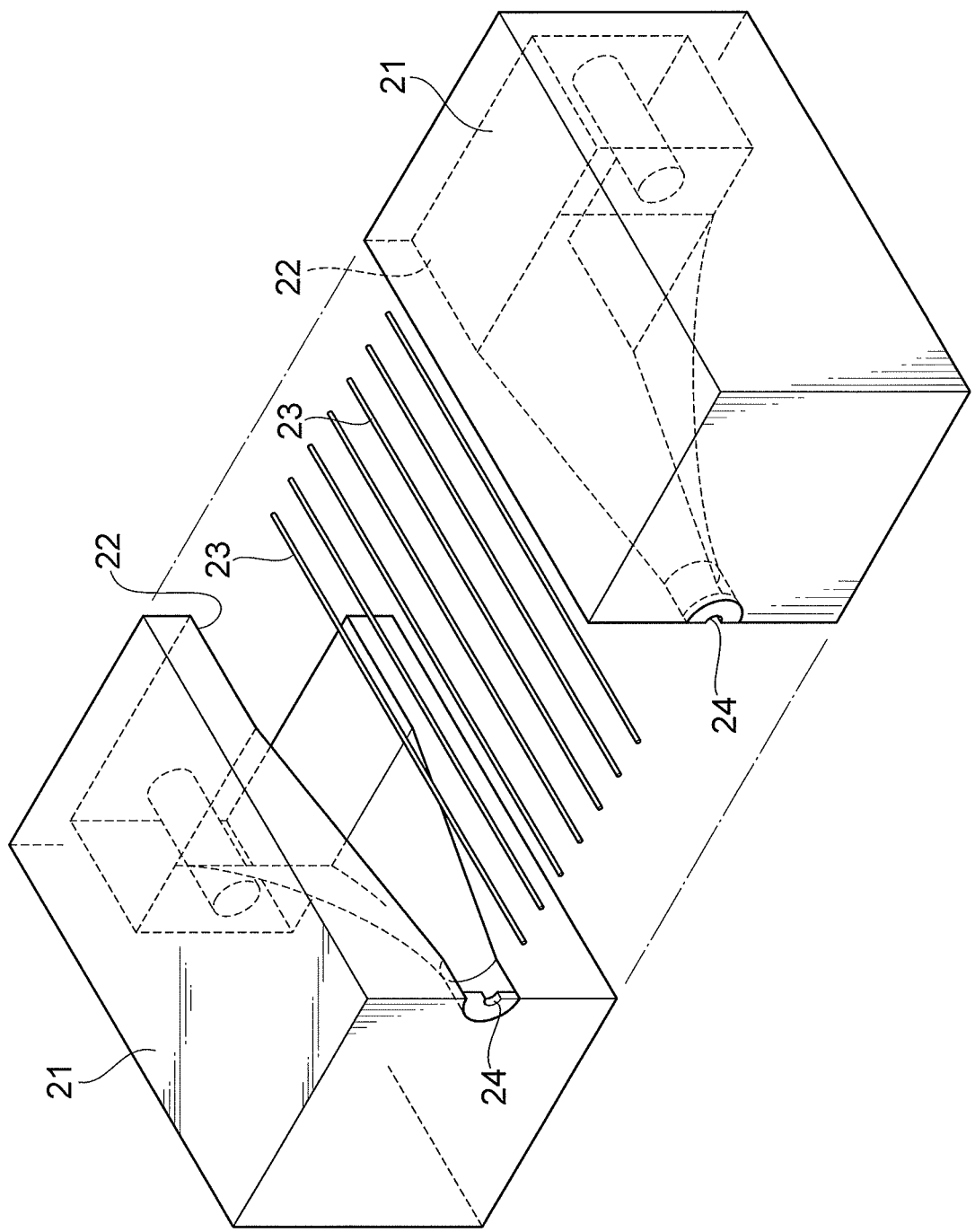
FIG. 5 is a perspective view showing an example of the manufacturing process of the optical connecting member illustrated in FIG. 1.

The foregoing optical connecting member 1 can be formed, for example, via injection molding. In the foregoing case, foremost, as shown in FIG. 5, a pair of molds 21 having recessed parts 22 according to the shape of the main body part 11 is prepared. The recessed parts 22 respectively correspond to the shape of one half portion and to the shape of the other half portion of the main body part 11 in the width direction, and, when the molds 21 are closed, form a space S (refer to FIG. 6) of the same shape as the main body part 11 in the molds 21. The recessed parts 22 are provided with a reduced diameter part 24 that is more on the tip side than the forming position of the first end 13.

Figure 6:
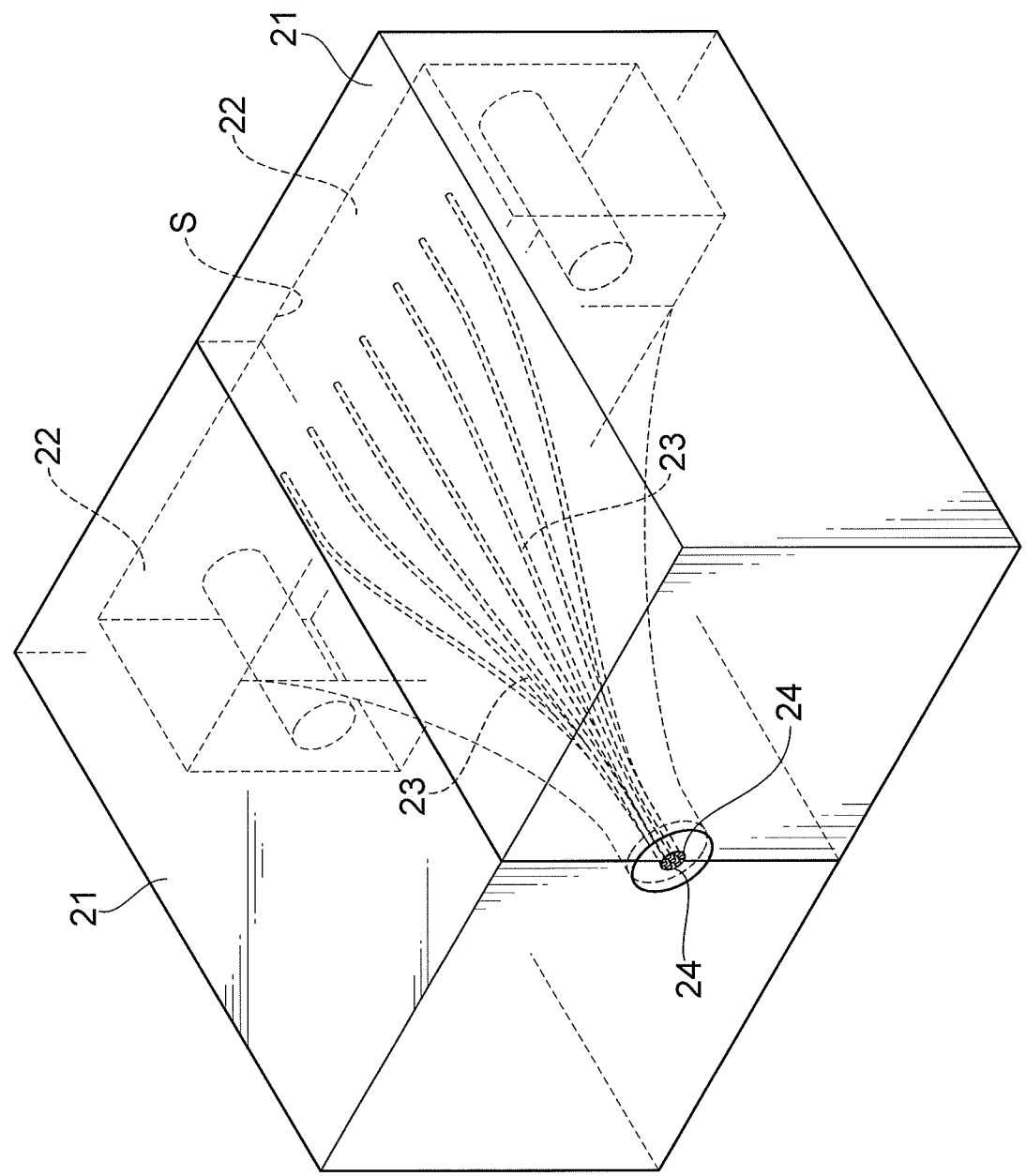
FIG. 6 is a perspective view showing the process that is subsequent to the process of FIG. 5.

Next, a plurality of (same number as the number of cores of the MCF2) molding pins 23 made from an elastic member are prepared, and disposed between the recessed parts 22. When the pair of molds 21 is closed in this state, as shown in FIG. 6, the tips of the respective molding pins 23 are bound to be parallel to each other due to the reduced diameter part 24, and become a moderately deformed state in the space S due to the elastic deformation. Consequently, each of the molding pins 23 will have a straight-line portion which is orthogonal to the first end face 13a and a straight-line portion which is orthogonal to the second end face 14a. Thereafter, when resin is poured from a resin pouring hole (not shown) of the molds 21 and the molding pin 23 is removed, obtained is the main body part 11 formed with a plurality of through-holes 17.

Figure 7:
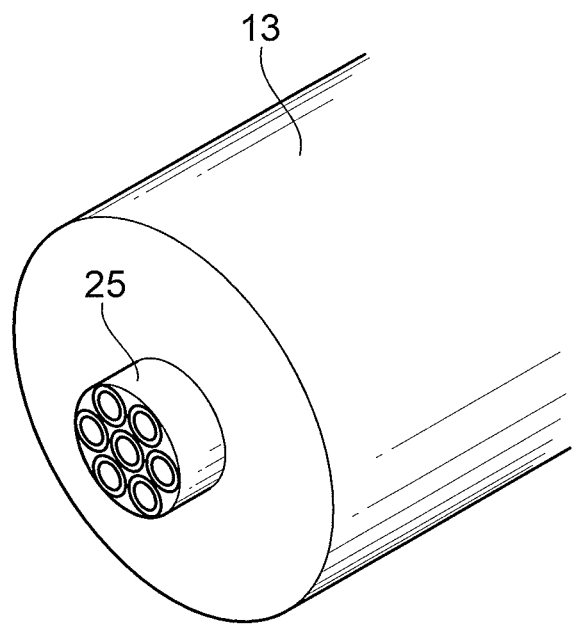
FIG. 7 is a perspective view showing the first end of the main body part immediately after molding.

On the first end face 13a of the main body part 11 obtained above, as shown in FIG. 7, a convex part 25 corresponding to the shape of the reduced diameter part 24 will remain. Accordingly, by removing the convex part 25 via grinding or the like, the first end face 13a is formed. Since the through-holes 17 have mutually parallel direct portions corresponding to the connected end 12A at the first end 13, even if the foregoing grinding or the like is performed, the parallelism of the optical axis of the waveguide parts 12 is maintained. Finally, by inserting the SCFs 18 into the respective through-holes 17, the optical connecting member 1 is obtained. Note that when the amount of protrusion of the convex part 25 is small (for example, around the same length as the core diameter), the convex part 25 may be left as is. This is because, even when connected with the MCF 2, it is unlikely that the convex part 25 will become damaged.

Figure 8:
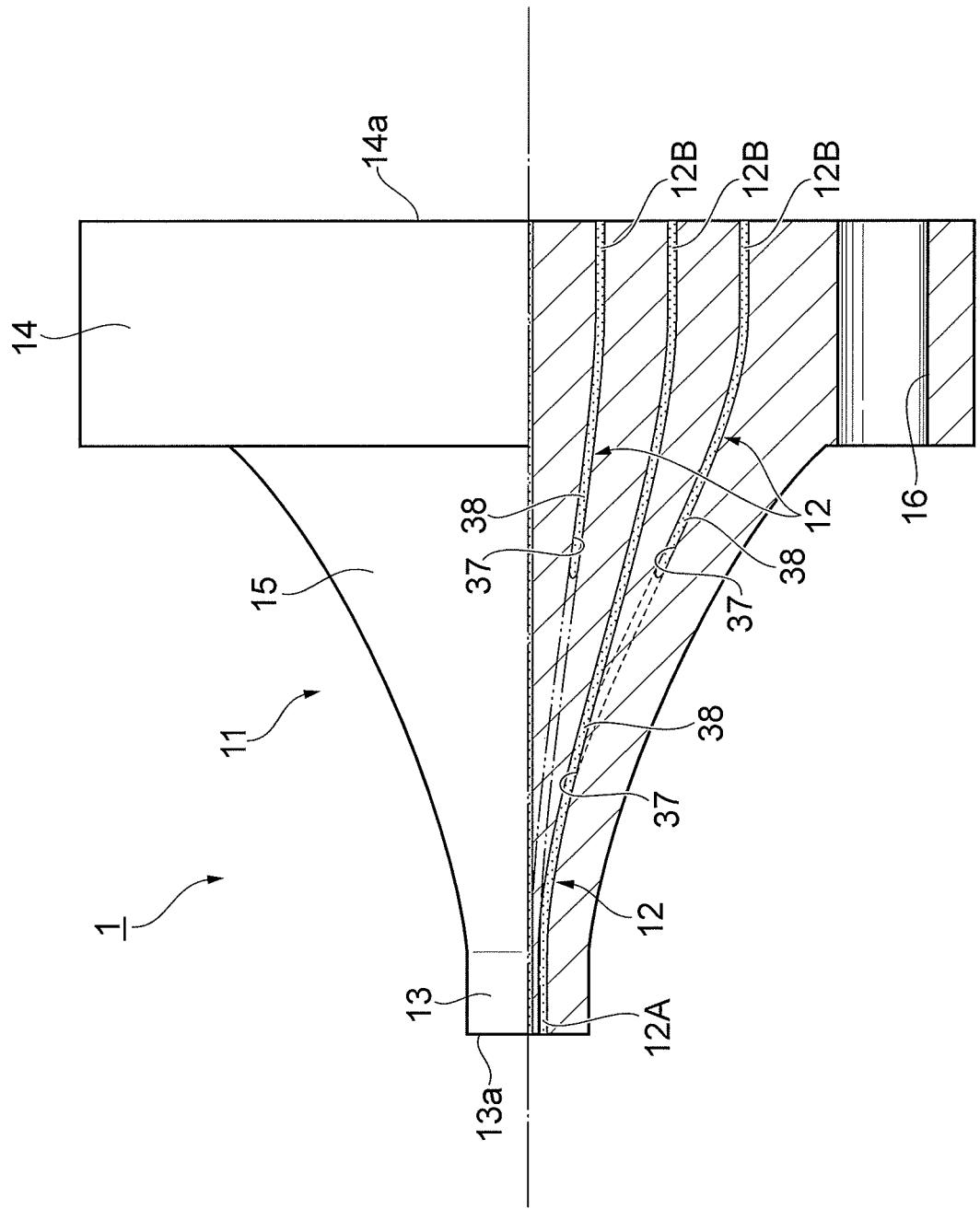
FIG. 8 is a diagram showing a modified example of the optical connecting member according to the first embodiment of the present invention.

The present invention is not limited to the foregoing embodiment, and may be modified variously. For example, while in the foregoing first embodiment the SCFs 18 were disposed in the through-holes 17 to configure the waveguide parts 12, but as shown in FIG. 8, it is also possible to form the waveguide parts 12 by forming through-holes 37 having the same diameter as the core diameter of the MCF 2, and filling a fluid 38 having a refractive index that is higher than the main body part 11 in the through-hole 37. As the fluid 38, for example, matching oil containing silicone resin or the like may be used.

Figure 9:
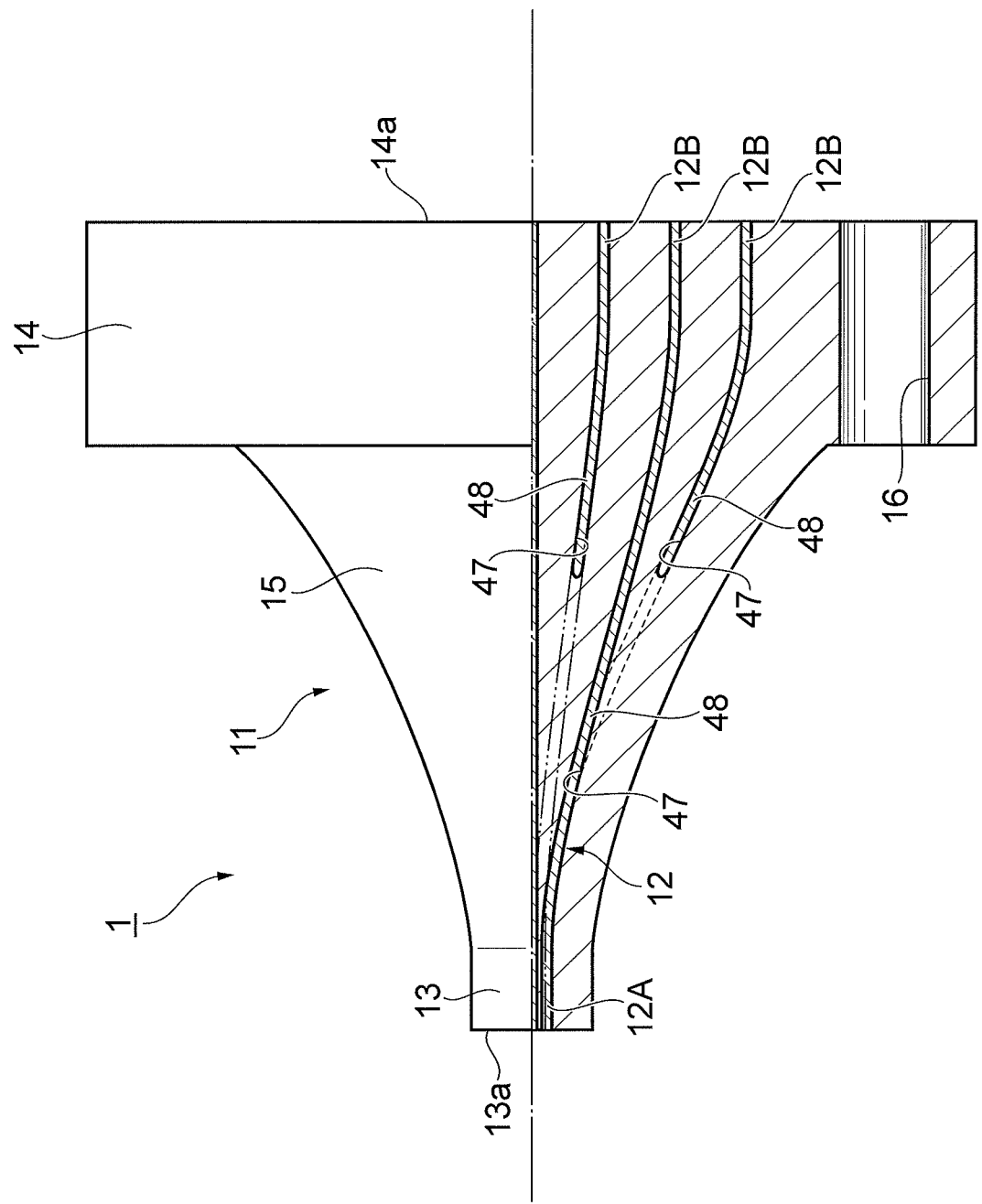
FIG. 9 is a diagram showing another modified example of the optical connecting member according to the first embodiment of the present invention.

Moreover, as shown in FIG. 9, it is also possible to form the waveguide parts 12 by forming through-holes 47 having the same diameter as the core diameter of the MCF 2, and coating the inner wall of the through-holes 47 with an optical reflective film 48. As the optical reflective film 48, for instance, a Au film formed via electroless plating or the like may be used. The waveguide parts 12 with inhibited optical connecting loss can also be formed simply with the foregoing configurations.

In addition, the SCFs 18 disposed in the through-holes 17 may extend from the second end face 14a with a sufficient length (refer to FIG. 26 described later). Consequently, the SCFs 18 extending from the second end face 14a of the optical connecting member 1 can be directly connected to another optical device without having to use a guide pin. In the foregoing case, since there will be no connecting part between the waveguide parts 12 and the second end face 14a of the SCFs 3 unlike the foregoing embodiments, there is no need for a straight-line portion in which the diverged end 12B which diverges to the second end face 14a is orthogonal to the second end face 14a. Moreover, in the foregoing case, the SCFs 18 that are fixed inside the optical connecting member 1 are preferably coated optical fibers.

In other words, the SCFs 18 preferably have a reduced diameter on the first end face 13a side with the coating removed, and at least a part of the coating is fixed inside the optical connecting member 1. When forming this kind of optical connecting member 1, used is a molding pin 23 in which one end is of an enlarged diameter (corresponds to the coating diameter) and the other end is of a reduced diameter (corresponds to the outer diameter of the portion in which the coating was removed), and, by disposing the enlarged diameter side to face the second end face 14a side, the same process described above may be used for subjecting the main body part 11 to injection molding.

Figure 10:
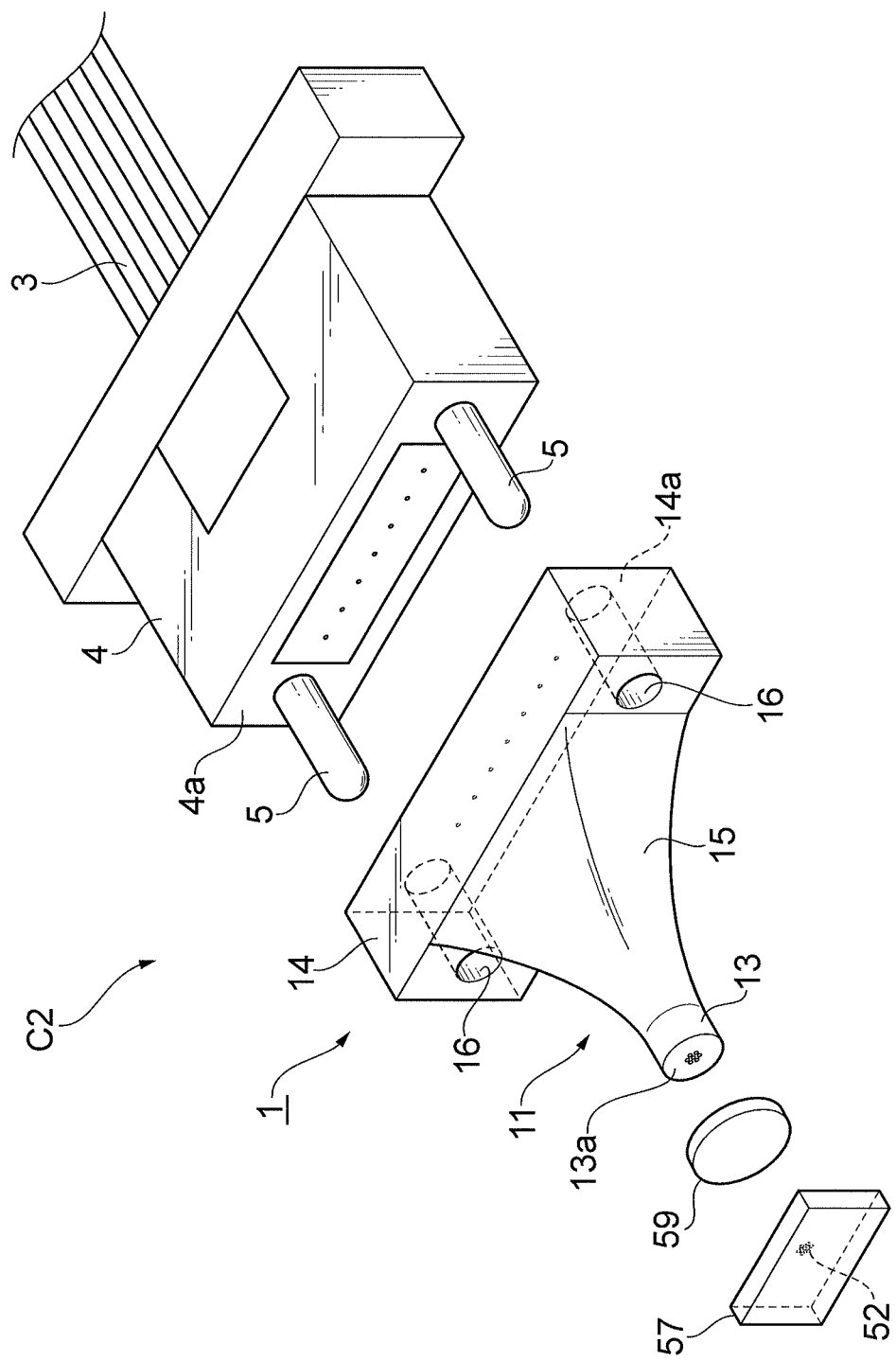
FIG. 10 is a perspective view showing a modified example of the optical connecting structure according to the first embodiment of the present invention.
Figure 11:
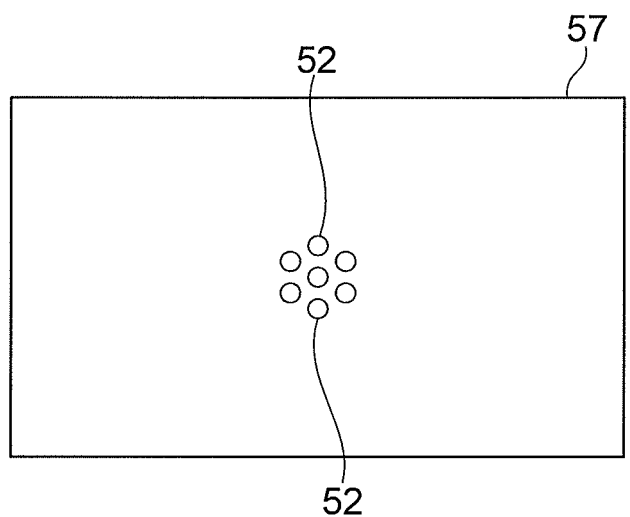
FIG. 11 is a plan view showing the receiving/emitting element that is used in the optical connecting structure shown in FIG. 10.

Moreover, with the foregoing embodiment, as shown in FIG. 1, an optical connecting structure in which the optical connecting member 1 is connected to the MCF 2 was explained. However, as shown in FIG. 10, it is also possible to adopt an optical connecting structure C2 in which the optical connecting member 1 is connected to a receiving/emitting element 57 via a connecting lens 59 (light collection optical system). The receiving/emitting element 57 comprises, as shown in FIG. 11, a plurality of (seven in the example of FIG. 11) light receiving/emitting parts 52 which are arrayed as with the core array of the MCF 2, and, according to the optical connecting structure C2, the plurality of waveguide parts 12 and the optical axis of the plurality of light receiving/emitting parts 52 can be matched easily as with the optical connecting structure C1. Accordingly, even in cases where the receiving/emitting element 57 is used as an example of the optical element, in comparison to cases where light is emitted obliquely from the first end face 13a and the second end face 14a, optical connecting loss can be inhibited favorably.

Figure 12:
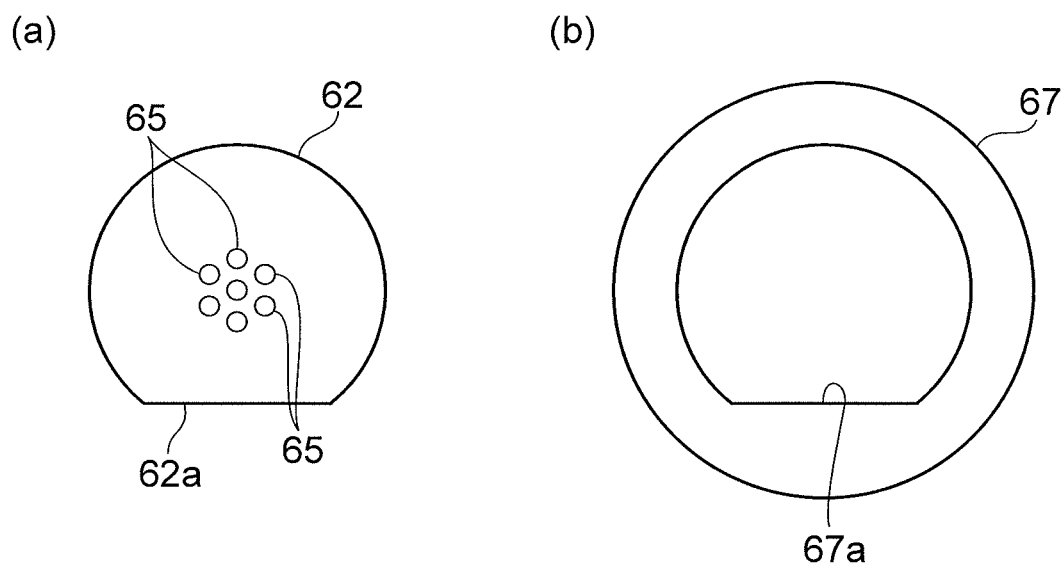
FIG. 12 is a diagram showing a modified example of the multi-core fiber and the optical ferrule used in the optical connecting structure illustrated in FIG. 1.

Moreover, while the foregoing embodiment explained a case of inserting the MCF 2 having a circular cross section into the optical ferrule 7, as shown in FIG. 12, the configuration may also be such that a flat face 62a is provided by cutting out a part of the MCF 62, and providing a flat face 67a corresponding to the flat face 62a to the inner hole of the optical ferrule 67. According to this restrictive structure, the rotation of the MCF 62 can be restricted by the optical ferrule 67. While the foregoing manufacturing method configured the waveguide parts 12 by forming the through-holes 17 in the main body part 11 by using the molding pin 23, and thereafter disposing the SCFs 18 in the through-holes 17, it goes without saying that a configuration where the SCFs 18 are disposed in the pair of molds 21, without using the molding pin 23, in order to configure the waveguide parts 12 may also be adopted.

Second Embodiment

The second embodiment of the present invention is now explained.

Figure 13:
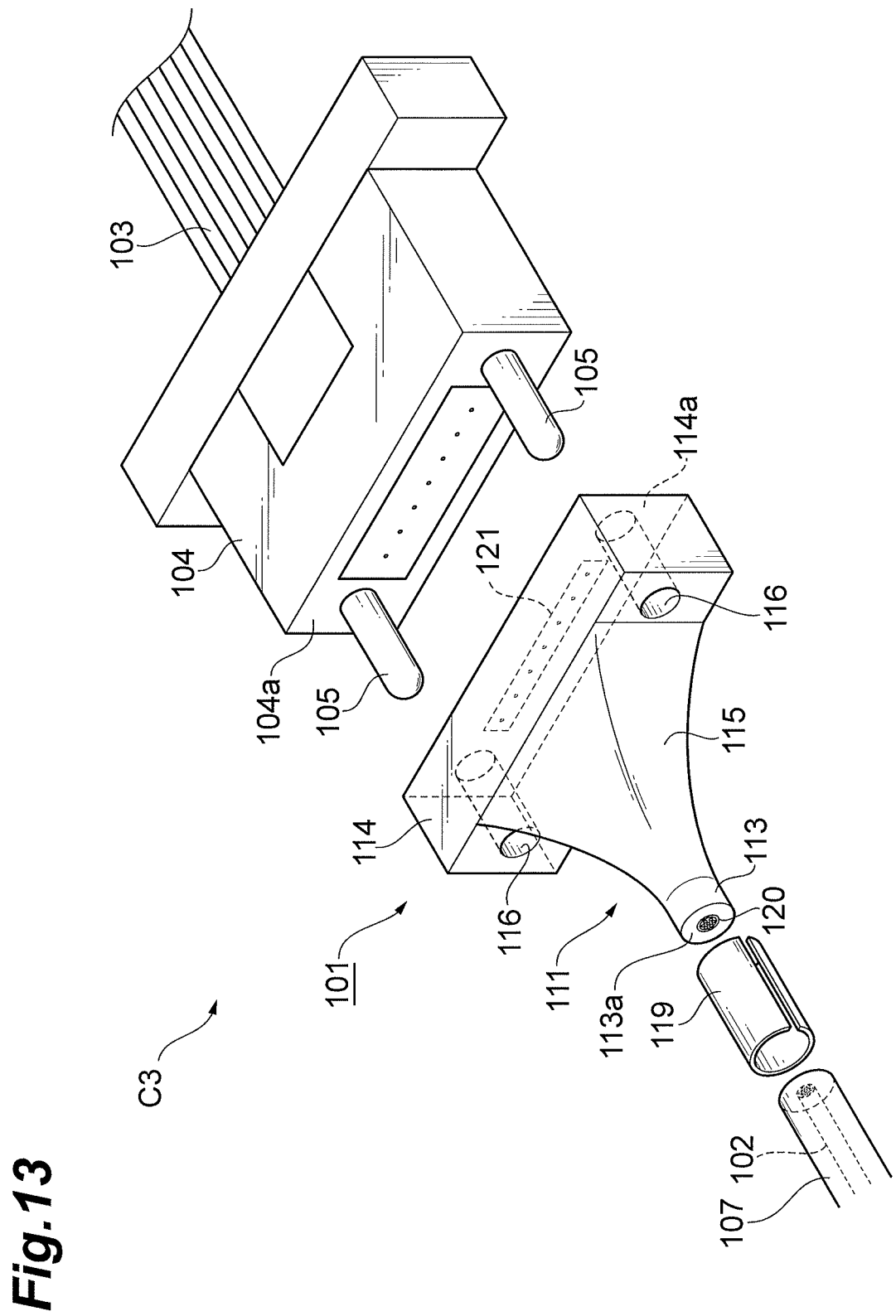
FIG. 13 is a perspective view showing the optical connecting member and the optical connecting structure according to the second embodiment of the present invention.
Figure 14:
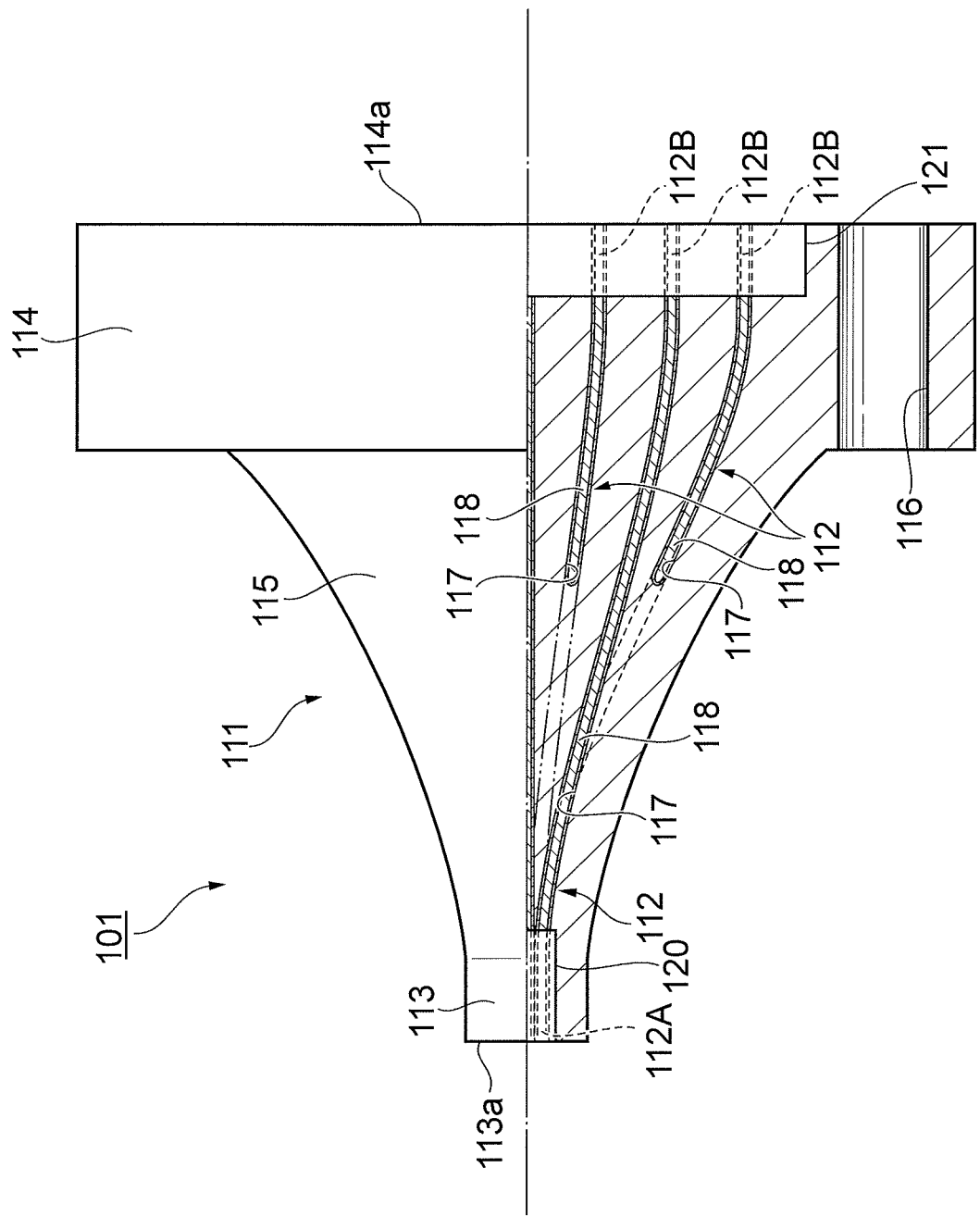
FIG. 14 is a plan view with a part of the optical connecting member illustrated in FIG. 13 broken away.

FIG. 13 is a perspective view showing an example of a mode of connecting the multi-core fiber and the plurality of single-core fibers with the optical connecting member according to the second embodiment of the present invention. FIG. 14 is a plan view with a part of the optical connecting member illustrated in FIG. 13 broken away. As shown in FIG. 13, an optical connecting member 101 is an optical connecting member for connecting a multi-core fiber (hereinafter referred to as "MCF") 102, and a plurality of single-core fibers (hereinafter referred to as "SCFs") 103. By using the optical connecting member 101, the MCF 102 as one example of the optical element and the SCFs 103 as one example of the optical component are optically connected to configure an optical connecting structure C3. Note that the optical connecting member 101 may also be used to form the optical connecting structure C2 shown in FIG. 10.

The MCF 102 (optical element) is a fiber in which a plurality of cores (optical I/O parts) are disposed in the same clad so that their mutual optical axes become parallel. Preferably, a plurality of cores of the MCF 102 are disposed so that the inter-core distance thereof becomes equal, respectively. While the core array may be a one-dimensional array in which a plurality of cores are disposed linearly, for instance, the core array is preferably a two-dimensional array such as a triangular lattice or square array.

The MCF 102 of this embodiment is of a triangular lattice-shaped two-dimensional array, with one core at the center position of the clad and six cores around the center core at 60° intervals; that is, a total of seven cores are disposed at mutually regular intervals. For instance, when there is no center core, a precise triangular lattice array is not formed, but the present invention includes an array that realizes a triangular lattice array upon assuming the existence of the center core.

Meanwhile, the SCFs 103 (optical components) are fibers having a core of the same diameter as the MCF 102, and in which the cladding diameter of at least the tip portion is reduced so as to become equal to the inter-core distance of the MCF 102. An MT connector 104 is mounted at the tip of the plurality of SCFs 103. A tip face 104a of the MT connector 104 is provided with guide pins 105 for mounting the optical connecting member 101. The tips of seven SCFs 103 are exposed horizontally in one line at a predetermined pitch according to the number of cores of the MCF 102 between the guide pins 105.

The optical connecting member 101 comprises, as shown in FIG. 13 and FIG. 14, a main body part 111 formed from plastic resin such as polyphenylenesulfide (PPS) resin or polyetherimide (PEI) resin which is used for configuring a standard optical connector, a plurality of (in this example, seven) waveguide parts 112 provided in the main body part 111, and first and second fixing components 120, 121 for fixing the respective ends of the plurality of waveguide parts 112. The main body part 111 has a first end 113 including a first end face 113a to be connected to an end face of the MCF 102, a second end 114 including a second end face 114a to be connected to an end face of the SCFs 103, and an intermediate part 115 positioned between the first end 113 and the second end 114.

The first end 113 has a cylindrical shape with the same diameter as the outer diameter of a ferrule 107 into which the MCF 102 has been inserted, and the end face thereof is the first end face 113a having a circular cross section. The length of the first end 113 is, for example, 5 times or more of the core diameter of the MCF 102. Meanwhile, the second end 114 is of a substantial hexahedron shape, and the end face thereof is the second end face 114a having the same shape as the tip face 104a of the MT connector 104. As with the first end 113, the length of the second end 114 is, for example, 5 times or more of the core diameter of the MCF 102.

The second end 114 is provided with fitting holes 116 into which the guide pins 105 of the MT connector 104 are fitted. The intermediate part 115 has a shape which spreads toward the bottom from the first end 113 side to the second end 114 side so as to connect the cylindrical first end 113 and the substantially rectangular second end 114. The main body part 111 may also be formed from epoxy resin in substitute for the foregoing PPS and the like.

More specifically, the waveguide part 112 is configured from the through-holes 117 extending in the main body part 111 so as to connect the first end face 113a and the second end face 114a, and the SCFs 118 tightly disposed in through-holes 117. The SCFs 18 are fibers similar to the SCFs 103, and the cladding diameter thereof is reduced so as to become equal to the inter-core distance of the MCF 102. The intermediate portion of the waveguide part 112 curves gently along the shape of the main body part 111 between the first end face 113a and the second end face 114a, and joins the connected end 112A and the diverged end 112B.

The first fixing component 120 is, as shown in (a) of FIG. 17, a component having a hollow cylindrical shape, and fixes the plurality of waveguide parts 112 on the first end 113 side so that the connected end 112A of each of the plurality of waveguide parts 112 becomes parallel to each other. As a result of being fixed in parallel as described above, each of the connected ends 112A of the plurality of waveguide parts 112 which is connected to the first end face 113a becomes a straight-line portion. The first fixing component 120 is disposed in the main body part 111 so that the foregoing straight-line portion is orthogonal to the first end face 113a. The term "orthogonal" as used in this embodiment shows, for example, that the angle relative to the first end face 113a is within a range of 90 degrees±0.5 degrees, but it is obvious to a person skilled in the art that the foregoing range can be increased or decreased as needed according to the connecting precision by the optical connecting member.

Figure 15:
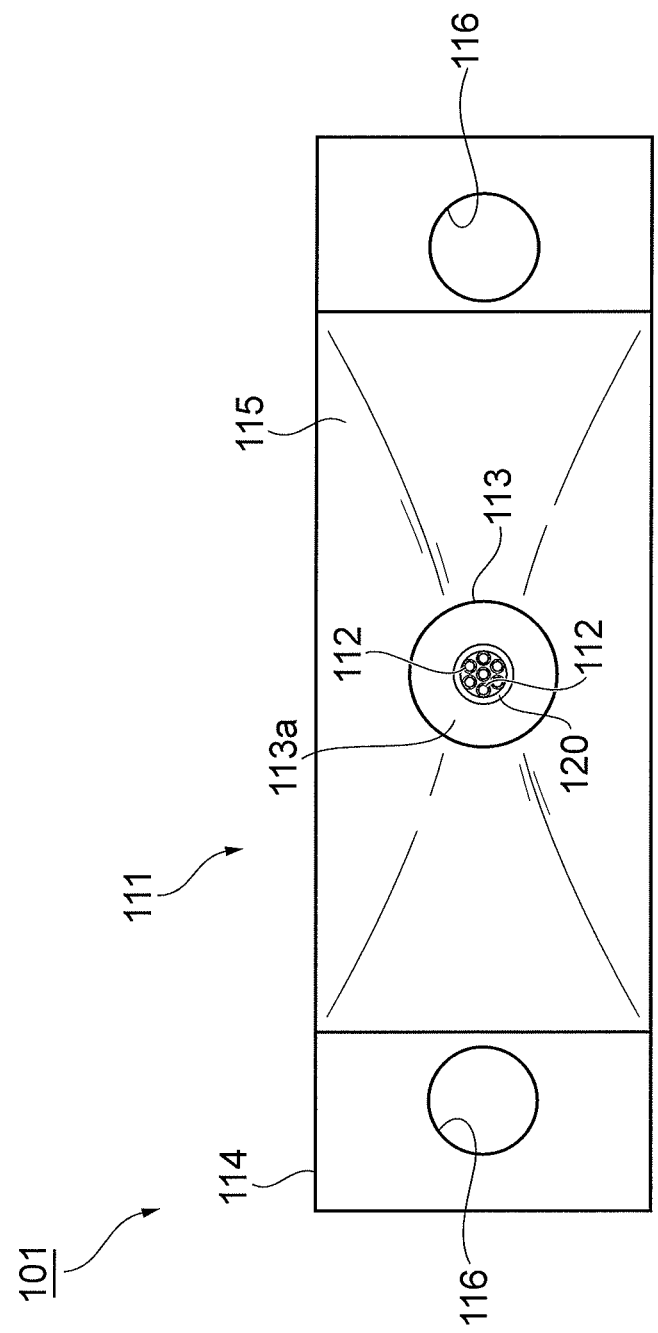
FIG. 15 is a diagram showing the first end face of the main body part of the optical connecting member illustrated in FIG. 13.

Moreover, the plurality of waveguide parts 112 are, as shown in FIG. 15, arrayed two-dimensionally by the first fixing component 120 so as to correspond to the plurality of cores of the MCF 102 at the connected end 112A. As shown in (a) of FIG. 17, an inner peripheral face 120a of the first fixing component 120 has a tapered part 120b which spreads outward on the side (second end face 114a side) that is opposite to the first end face 113a, and can be easily spread as the plurality of waveguide parts 112 head toward the second end face 114a.

Figure 16:
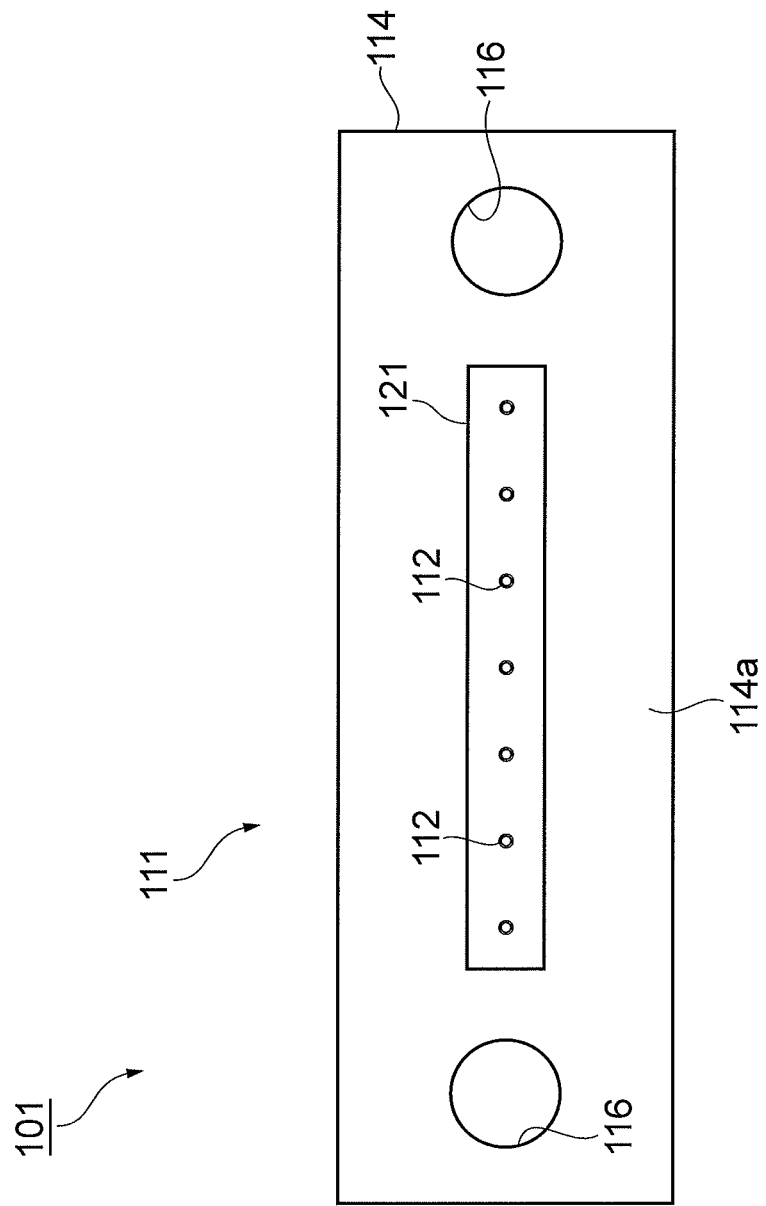
FIG. 16 is a diagram showing the second end face of the main body part of the optical connecting member illustrated in FIG. 13.

The second fixing component 121 is a component which takes on a substantial hexahedron shape as shown in (b) of FIG. 17, and is internally formed with seven through-holes 121a to 121g. The second fixing component 121 fixes the plurality of waveguide parts 112 on the second end 114 side so that the diverged end 112B of each of the plurality of waveguide parts 112 becomes parallel to each other. As a result of being fixed in parallel as described above, each of the diverged end 112B of the plurality of waveguide parts 112 which is diverged to the second end face 114a becomes a straight-line portion. The second fixing component 121 is disposed in the main body part 111 so that the foregoing straight-line portion is orthogonal to the second end face 114a. The plurality of waveguide parts 112 are arrayed, as shown in FIG. 16, one-dimensionally by the second fixing component 121 so as to correspond to the plurality of cores of the SCFs 103 at the diverged end 12B.

The first and second fixing components 120, 121 are formed, for example, from metal, resin, ceramic or the like, and is configured from a component for use in insert molding when the optical connecting member 101 is manufactured via insert molding as described later. While the first fixing component 120 may be formed from any one of the foregoing materials, when the first fixing component 120 is formed from zirconia, the operation of inserting the SCFs 118 of the waveguide parts 112 into the first fixing component 120 is facilitated, and this is even more preferable. The length of the first and second fixing components 120, 121 and the connected end 112A and the diverged end 112B is, for example, 3 to 5 times or more of the core diameter of the MCF 102.

As a result of being fixed by the first fixing component 120, one end face of the waveguide part 112 is exposed on the first end face 113a so as to cause the core position of the MCF 102 and the core position of the SCFs 118 to correspond, and, as shown in FIG. 15, one core is disposed at the center position of the first end face 113a and six cores are disposed around the center core at 60° intervals; that is, a total of seven cores are disposed at mutually regular intervals. As a result of being fixed by the second fixing component 121, the other end face of the waveguide part 112 is exposed on the second end face 114a so as to cause the core position of the SCFs 103 and the core position of the SCFs 118 to correspond, and, as shown in FIG. 16, disposed horizontally in one line at a predetermined pitch between the fitting holes 116.

With the optical connecting member 101 configured as described above, in a state where the core position of the MCF 102 and the position of the waveguide parts 112 on the first end face 113a are matched, by causing the end face of the MCF 102 fixed by the ferrule 107 and the first end face 113a of the main body part 111 to come into contact inside the split sleeve 119, and additionally fitting the guide pins 105 into the fitting holes 116 of the second end 114 and causing the tip face 104a of the MT connector 104 and the second end face 114a of the main body part 111 to come into contact, the MCF 102 and the plurality of SCFs 103 can be connected via the waveguide parts 112.

Here, with the optical connecting member 101, the connected end 112A of each of the plurality of waveguide parts 112 which is connected to the first end face 113a is a straight-line portion that is orthogonal to the first end face 113a, and the connected ends 112A are parallel to each other. In other words, the optical axes of the plurality of waveguide parts 112 are parallel to each other on the first end 113 side. Consequently, the optical axis of the MCF 102 respectively having optical axes which are parallel to each other and the connecting part of the waveguide parts 112 can be matched easily.

The diverged end 112B which is diverged to the second end face 114a is a straight-line portion that is orthogonal to the second end face 114a, and the diverged ends 112B are parallel to each other. In other words, the optical axes of the plurality of waveguide parts 112 are parallel to each other on the second end 114 side. Consequently, the optical axis of the SCFs 103 respectively having optical axes which are parallel to each other and of the connecting part of the waveguide parts 112 can also be matched easily. Accordingly, in comparison to cases where light is emitted obliquely from the first end face 113a and the second end face 114a, or cases where the optical axis of the light from the respective waveguide parts 112 is misaligned from each other, optical connecting loss can be inhibited favorably according to the optical connecting member 101.

Figure 18:
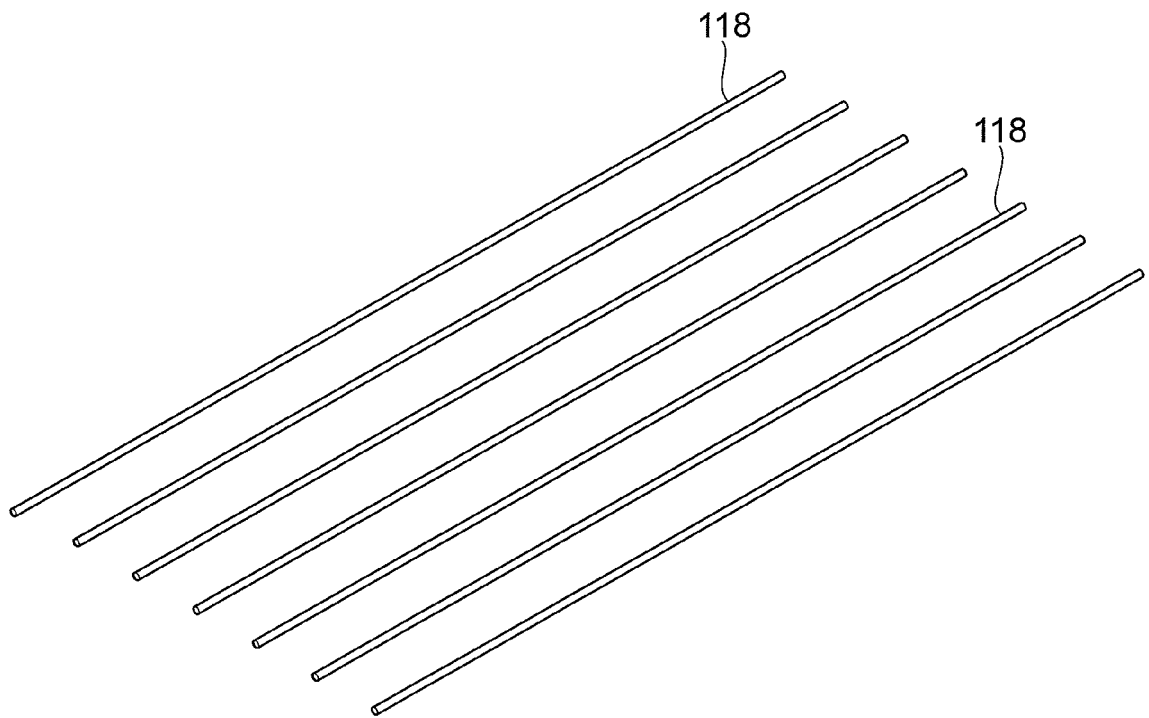
FIG. 18 is a perspective view showing an example of the manufacturing process of the optical connecting member illustrated in FIG. 13, and is a diagram showing the process of preparing the SCFs.

The foregoing optical connecting member 101 can be formed, for instance, via insert molding. In the foregoing case, foremost, as shown in FIG. 18, seven SCFs 118 for configuring the waveguide parts 112 are prepared. Moreover, the first and second fixing components 120, 121 for fixing the ends of the SCFs 118 are prepared.

Figure 19:
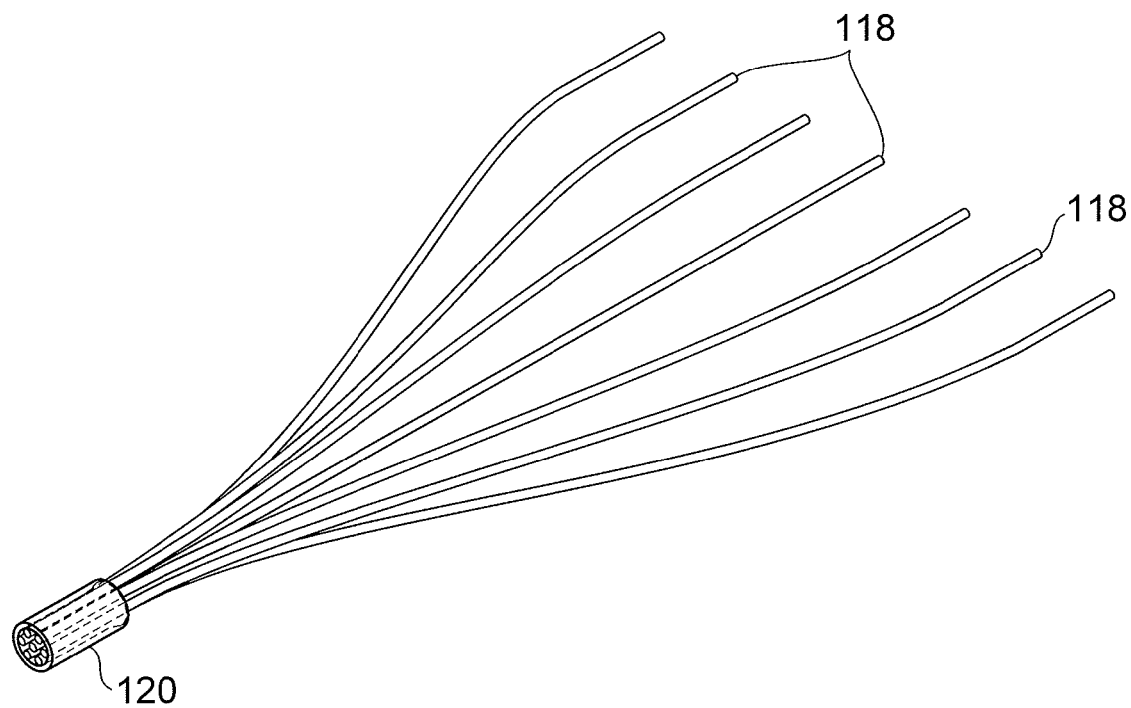
FIG. 19 is a perspective view showing the process of inserting one end of the SCFs illustrated in FIG. 18 into the first fixing component.

Subsequently, as shown in FIG. 19, one end (portion corresponding to the connected end 112A) of the SCFs 118 is inserted into the first fixing component 120, and, based on the first fixing component 120, one SCF 118 is disposed at the center position of the inner periphery of the first fixing component 120 and six SCFs 118 are disposed around such center position at 60 degree intervals; that is, a total of seven SCFs 118 are disposed at mutually regular intervals, and one end of each of the plurality of SCFs 118 is retained so as to become parallel to each other. This portion that is retained in parallel forms the straight-line portion.

Figure 20:
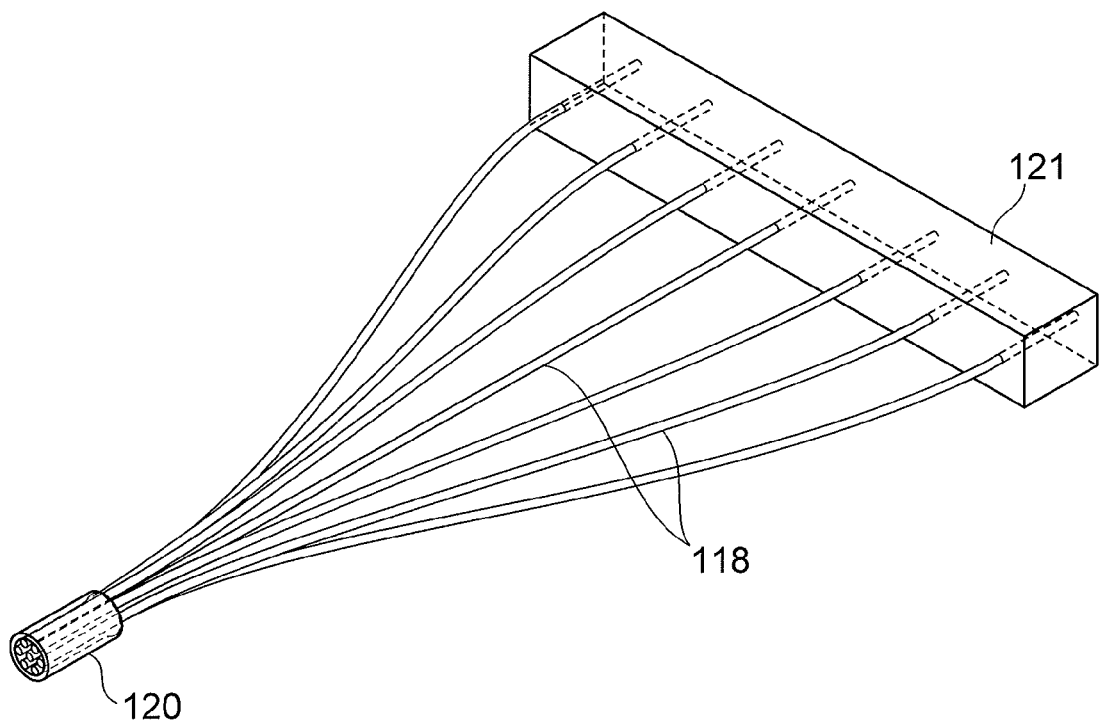
FIG. 20 is a perspective view showing the process of inserting the other end of the SCFs illustrated in FIG. 19 into the second fixing component.

Next, as shown in FIG. 20, the other end (portion corresponding to the diverged end 112B) if the SCF 118 having one end that is fixed by the first fixing component 120 is inserted to each of the through-holes 121a to 121g of the second fixing component 121, and, based on the second fixing component 121, the other end of each of the plurality of SCFs 118 is retained to be parallel to each other. This portion that is retained in parallel forms the straight-line portion. During the foregoing retention, the SCFs 118 deform and curve gently from one end to the other end due to elastic deformation.

Figure 21:
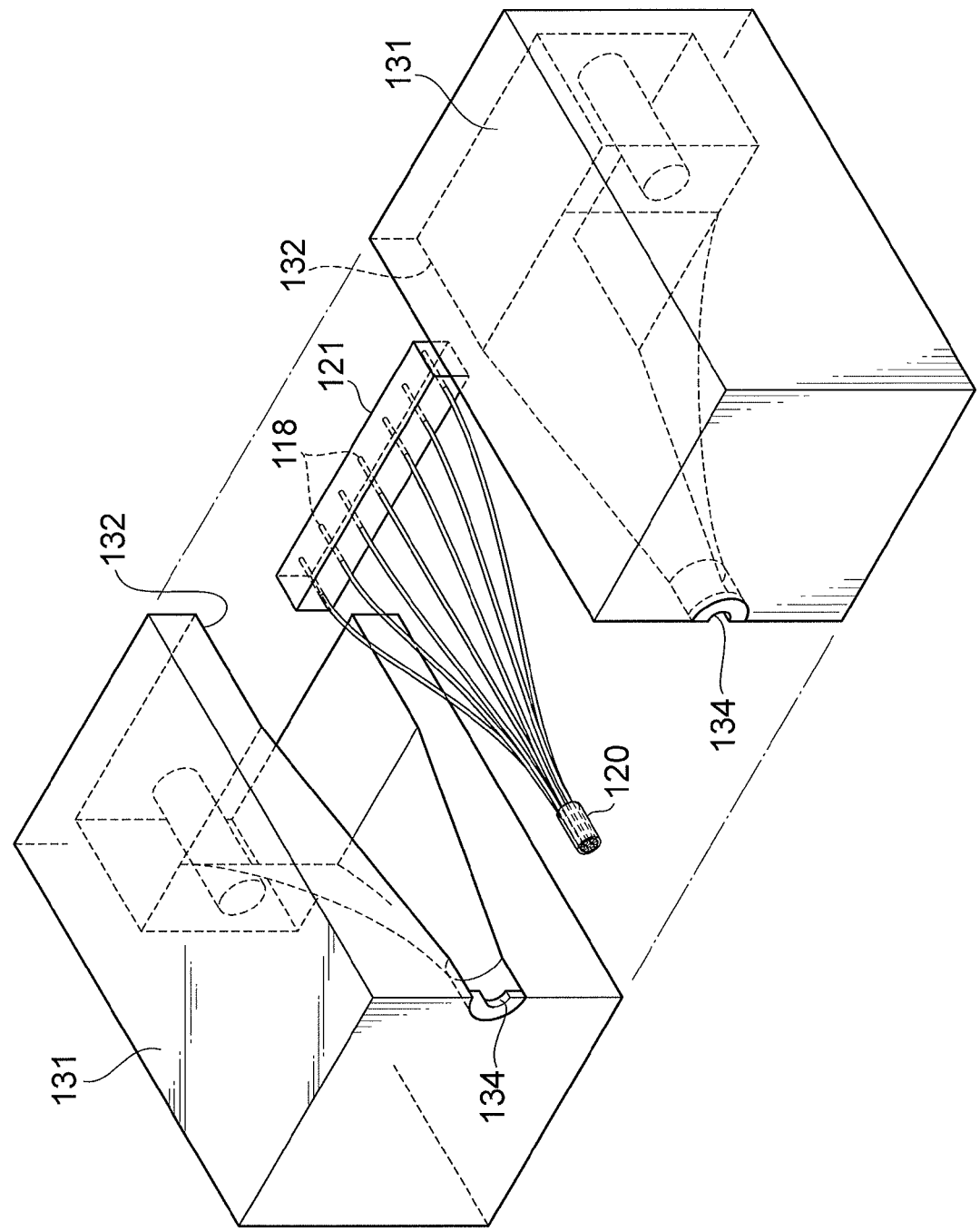
FIG. 21 is a perspective view showing the process of disposing the SCFs illustrated in FIG. 20 in the mold.

Subsequently, as shown in FIG. 21, a pair of molds 131 having recessed parts 132 according to the shape of the main body part 111 is prepared. The recessed parts 132 respectively correspond to the shape of one half portion and to the shape of the other half portion of the main body part 111 in the width direction, and, when the molds 131 are closed, form a space S (refer to FIG. 22) of the same shape as the main body part 111 in the molds 131. The recessed parts 132 are provided with a reduced diameter part 134 that is more on the tip side than the forming position of the first end 113.

In addition, the SCFs 118 in which either end thereof is fixed by the first and second fixing components 120, 121 are disposed between the recessed parts 122 of the molds 131. Upon the foregoing disposition, the first fixing component 120 is retained by the inner peripheral face of the reduced diameter part 134. Based on this retention, the first fixing component 120 is disposed in the molds 131 so that the straight-line portion of one end of the SCFs 118 is orthogonal to the first end face 113a after the molding is complete. The second fixing component 121 is also positioned relative to the recessed parts 122 by the same members. Based on this positioning, the second fixing component 121 is disposed in the molds 131 so that the straight-line portion of the other end of the SCFs 118 is orthogonal to the second end face 114a after the molding is complete.

Figure 22:
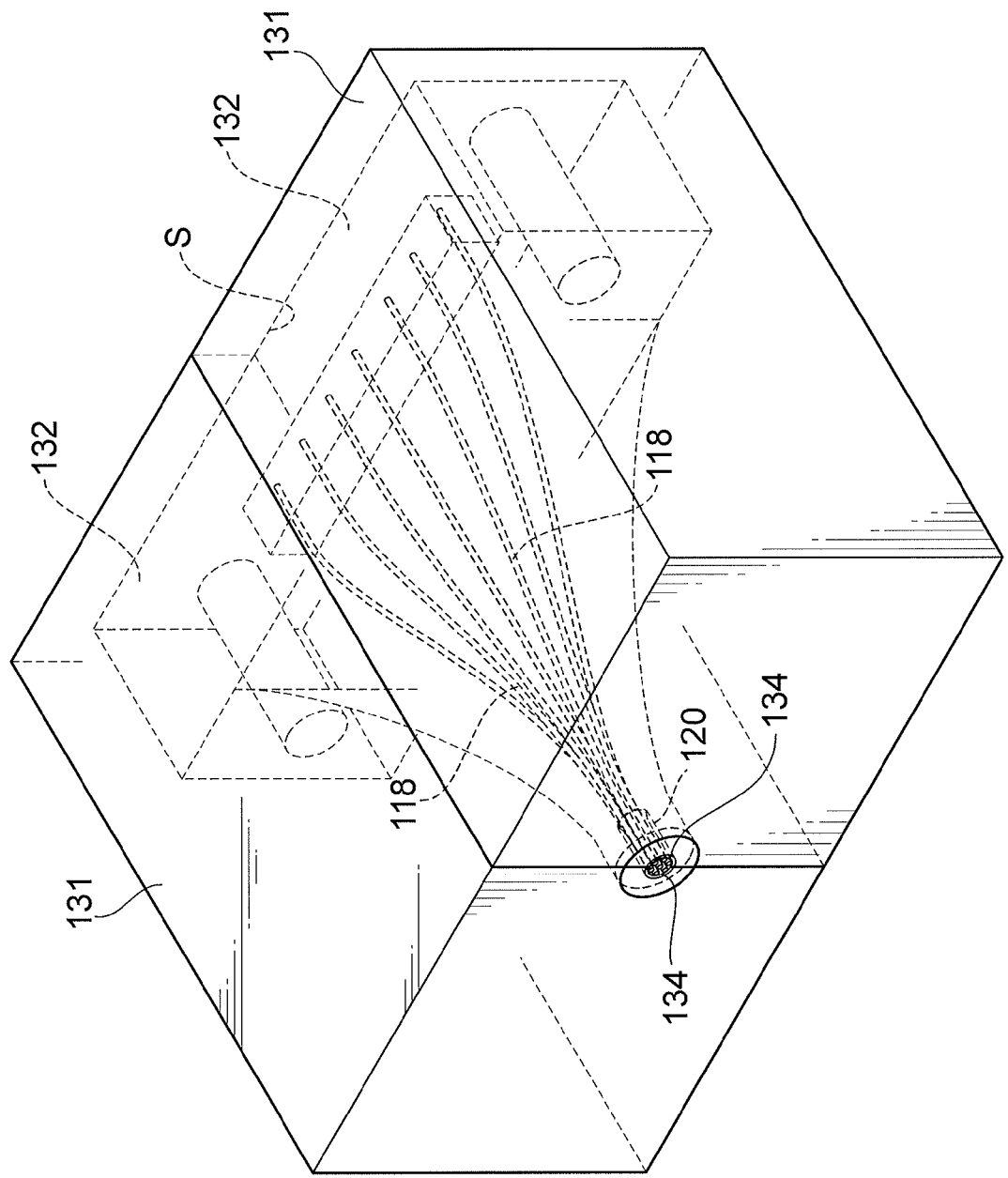
FIG. 22 is a perspective view showing the process of molding that is performed after the process illustrated in FIG. 21.

In this state, as shown in FIG. 22, when the pair of molds 131 are closed and resin (molding material) is poured from a resin pouring hole (not shown) of the molds 131, obtained is the optical connecting member 101 in which the plurality of waveguide parts 112 configured from the SCFs 118 and the first and second fixing components 120, 121 which respective fix the respective ends of the waveguide parts 112 are formed inside the main body part 111. Note that the transfer molding technique may also be used.

Figure 23:
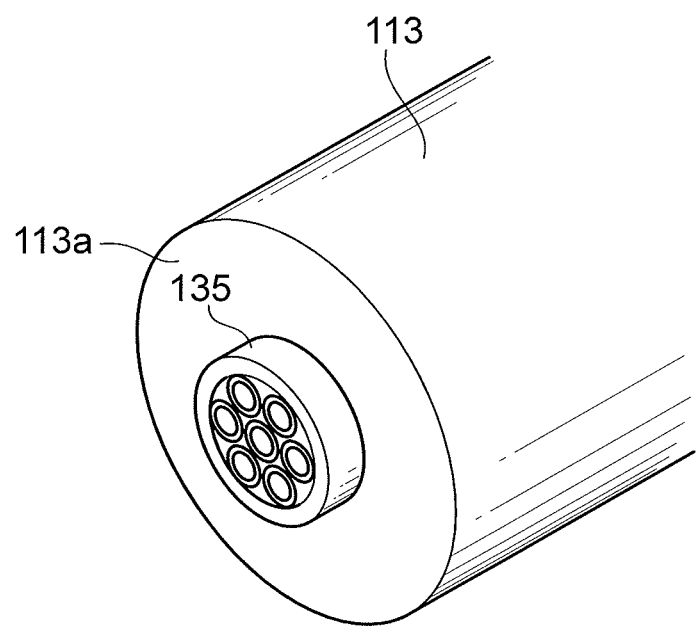
FIG. 23 is a perspective view showing the first end of the main body part immediately after molding.

On the first end face 113a of the main body part 111 obtained above, as shown in FIG. 23, a convex part 135 corresponding to the shape of the reduced diameter part 134 will remain. Accordingly, by removing the convex part 135 via grinding or the like, the first end face 113a is formed. The second end face 114a of the main body part 111 may also be subject to similar grinding or the like. Consequently, the optical connecting member 101 comprising the foregoing configuration is obtained. Note that when the amount of protrusion of the convex part 135 is small (for example, around the same length as the core diameter), the convex part 135 may be left as is. This is because, even when connected with the MCF 102 or SCFs 103, it is unlikely that the convex part 135 will become damaged. With the optical connecting member 101 according to this embodiment, since the waveguide parts 112 respectively have straight-line portions which are parallel to each other at either end 113, 114, the parallelism thereof will not be damaged even if grinding is performed to a certain extent.

As explained above, with the optical connecting member 101, the first fixing component 120 fixes the plurality of waveguide parts 112 so that the plurality of waveguide parts 112 are parallel to each other on the first end 113 side. Consequently, since the optical axis of the plurality of waveguide parts 112 becomes parallel to each other on the first end 113 side, the optical axis of the optical connecting member 101 and the optical axis of the MCF 102 can be matched easily, and optical connecting loss can be favorably inhibited. Moreover, with the optical connecting member 101, since each of the plurality of waveguide parts 112 comprises a region which becomes parallel to each other on the first end 113 side, it is possible to maintain the parallelism of the waveguide parts 112 even in cases where the connecting face of the optical connecting member 101 is polished to a certain degree in order to obtain a favorable connecting face.

Moreover, the optical connecting member 101 comprises a second fixing component 121 for retaining the other end of the plurality of waveguide parts 112 at the second end 114. Thus, based on the second fixing component 121, it is also possible to fix the plurality of waveguide parts 112 so that the plurality of waveguide parts 112 are parallel to each other also on the second end 114 side. Consequently, since the optical axis of the plurality of waveguide parts 112 becomes parallel to each other also on the second end 114 side, the optical axis of the optical connecting member 101 and the optical axis of the plurality of SCFs 103 can be matched easily, and optical connecting loss can be more favorably inhibited. Moreover, with this optical connecting member 101, since each of the plurality of waveguide parts 112 comprises a region which becomes parallel to each other on the second end 114 side, it is possible to maintain the parallelism of the waveguide parts even in cases where the connecting face of the optical connecting member is polished to a certain degree in order to obtain a favorable connecting face.

Moreover, with the optical connecting member 101, the first and second fixing components 120, 121 are components for use in insert molding. Thus, it is possible to easily produce the optical connecting member 101 in which the positioning of the first and second fixing components 120, 121 in the main body part 111 has been performed with precision.

Moreover, with the optical connecting member 101, the waveguide parts 112 are formed with the SCFs 118 having a cladding diameter which is equal to the distance between the plurality of cores of the MCF 102. Since the core array of the MCF 102 is normally formed so that the inter-core distance becomes equal, based on the foregoing configuration, waveguide parts 112 which are arrayed in the same manner as the core array of the MCF 102 can be easily obtained.

Moreover, with the optical connecting member 101, the end face 113a on the first end 113 side has a substantial circular shape. Thus, upon fixing the MCF 102 to a general-purpose cylindrical ferrule 107, an end face of the MCF 102 and the first end 113 of the optical connecting member 101 can be easily connected via the sleeve 119.

Moreover, with the optical connecting member 101, the end face of each of the waveguide parts 112 is arrayed at regular intervals at the first end 113. Since the core array of the MCF 102 is normally configured as a two-dimensional array so that the inter-core distance becomes equal, based on the foregoing configuration, connecting with the MCF 102 is facilitated.

Moreover, with the foregoing manufacturing method of the optical connecting member 101, provided is a step of retaining both ends of the plurality of waveguide parts 112 so that the plurality of waveguide parts 112 are mutually parallel in the fixing components 120, 121. In addition, the plurality of waveguide parts 112 retained in parallel as described above and the fixing components 120, 121 for fixing the plurality of waveguide parts 112 are disposed in the molds 131 and subject to insert molding. Thus, with the manufactured optical connecting member 101, the optical axis of the plurality of waveguide parts 12 becomes parallel to each other at either end, and the optical axis of the optical connecting member 101 and the optical axis of the MCF 102 and the SCFs 103 can be easily matched, and the optical connecting loss can be favorably inhibited.

The present invention is not limited to the foregoing embodiment, and may be modified variously. For example, in the foregoing second embodiment, while the first fixing component 120 had a cylindrical shape, as a guide part for matching and connecting the optical axis of the plurality of cores of the MCF 102 and the optical axis of one end of each of the plurality of waveguide parts 112, as shown in (a) of FIG. 24, it is also possible to provide a notch face 122a in which a part of the outer periphery is cut out to form a D-shaped cross section. In the foregoing case, since the first fixing component 122 for fixing the waveguide parts 112 will have the guide part matching the optical axes, the optical axis of the MCF 102 and the optical axis of the waveguide parts 112 can be more easily matched.

In the foregoing embodiment, while the fitting holes 116 were provided to the main body part 111 as guide parts for connecting to the SCFs 103 so that the optical axis of the plurality of SCFs 103 and the optical axis of the other end of the plurality of waveguide parts 112 will match, as shown in (b) of FIG. 24, fitting holes 124a, 124b comprising the foregoing function may also be included in the second fixing component 124. In the foregoing case, since the second fixing component for fixing the waveguide part 112 will have the guide part for matching the optical axes, the optical axis of the plurality of SCFs 103 and the optical axis of the waveguide parts 112 can be more easily matched.

Figure 25:
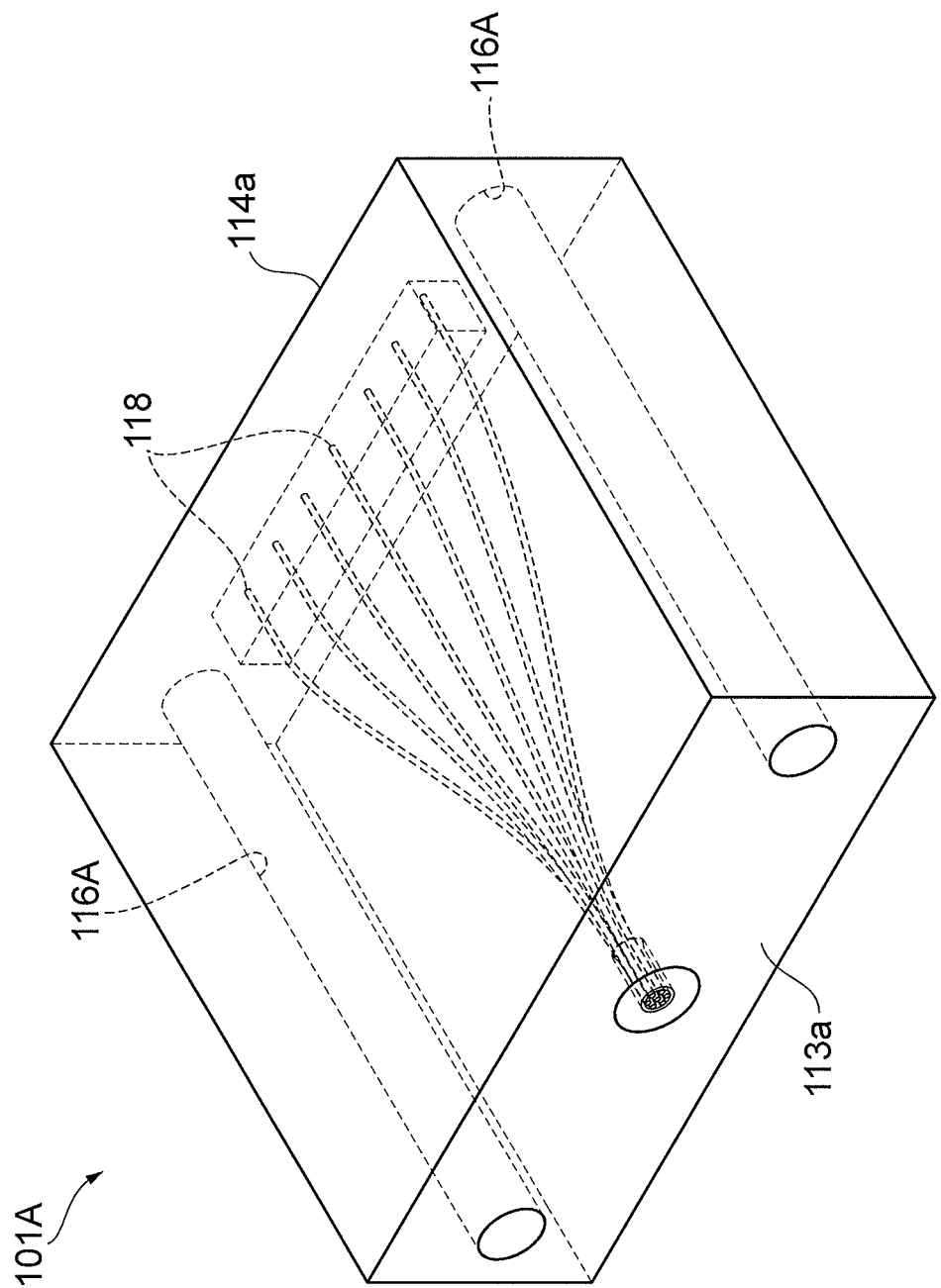
FIG. 25 is a diagram showing another modified example of the optical connecting member.

In the foregoing embodiment, while the main body part 111 had a shape which spreads toward the bottom from the first end 113 side to the second end 114 side so as to connect the cylindrical first end 113 and the substantially rectangular second end 114, as shown in FIG. 25, the overall outer shape may also be a substantial hexahedron. In the foregoing case, the configuration of the mold to be used for the molding can be simplified.

Figure 26:
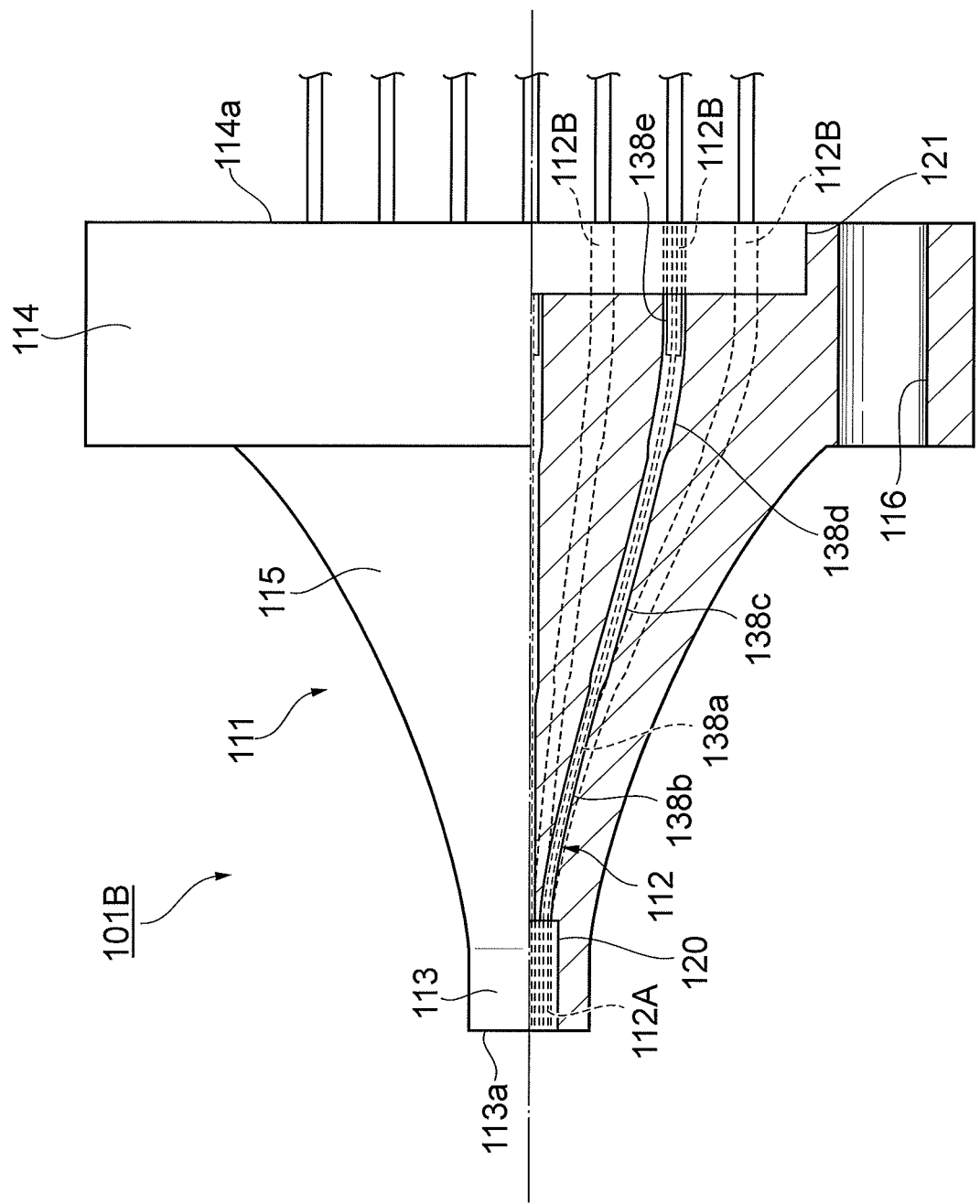
FIG. 26 is a diagram showing yet another modified example of the optical connecting member.

In the foregoing embodiment, while the SCFs 118 having a constant outer diameter were disposed in the through-holes 117 to form the waveguide parts 112, as shown in FIG. 26, SCFs 138 in which the core diameter 138a is constant, but the outer diameter gradually increases may also be used as the waveguide parts 112. With these SCFs 138, the smallest cladding diameter portion 138b is formed on the first end 113 side, and portions 138c, 138d have a diameter which increases toward the second end 114. At the portion 138d on the second end 114 side, a coated part 138e is formed internally, and the core covered with this coated part extends from the second end face 114a at a sufficient length (so-called pigtail-type component).

Consequently, the SCFs 138 extending from the second end face 114a of the optical connecting member 101 can be directly connected with another optical device without a guide pin. In the foregoing case, since there will be no connecting part between the waveguide parts 112 and the second end face 114a of the SCFs 103 unlike the foregoing embodiments, there is no need for a straight-line portion in which the diverged end 112B which diverges to the second end face 114a is orthogonal to the second end face 114a.

In the foregoing embodiment, upon manufacturing the optical connecting member 101, molding was performed after disposing the SCFs 118 in the molds 131. However, as explained in the first embodiment, after molding the main body part 111 by using a carbide pin having the same shape as the SCFs 118, it is also possible to remove the pin and thereby insert the SCFs 118 into the formed through-holes 117.

Moreover, while the foregoing embodiment explained a case where the first and second end faces 113a, 114a are formed to be perpendicular to the optical axis of the MCF 102 or the SCFs 103, in order to achieve a highly reflective optical connecting member, these end faces 113a, 114a may be ground to be inclined 8 degrees relative to the face that is perpendicular to the optical axis of the MCF 102 or the SCFs 103. In the foregoing case also, with the optical connecting member 101 according to this embodiment, since the waveguide parts 112 are parallel at the respective ends 113, 114, the optical axis of the optical connecting member 101 and the optical axis of the MCF 102 or the optical axis of the SCFs 103 can be easily matched, and optical connecting loss can be favorably inhibited.

INDUSTRIAL APPLICABILITY

According to the optical connecting member and the optical connecting structure of the present invention, an optical element including a plurality of optical I/O parts and another optical component can be efficiently connected via a simple configuration.

REFERENCE SIGNS LIST

1 . . . optical connecting member, 2 . . . MCF, 3 . . . SCF, 12 . . . waveguide part, 12A . . . connected end, 12B . . . diverged end, 13 . . . first end, 13a . . . first end face, 14 . . . second end, 14a . . . second end face, 18 . . . SCF, 37, 47 . . . through-hole, 38 . . . fluid, 48 . . . optical reflective film, C1, C2, C3 . . . optical connecting structure, 101, 101A, 101B . . . optical connecting member, 102 . . . MCF, 103 . . . SCF, 112 . . . waveguide part, 112A . . . connected end, 112B . . . diverged end, 113 . . . first end, 113a . . . first end face, 114 . . . second end, 114a . . . second end face, 118 . . . SCF, 120, 123 . . . first fixing component, 121, 124 . . . second fixing component, 122a . . . notch face, 124a, 124b . . . fitting hole.

The invention claimed is:

1. An optical connecting structure, comprising:
   an optical connecting member configured to connect an optical element to other optical component, the optical connecting member comprising:
      a main body part having a first end on the optical element side and a second end on the other optical component side;
      a plurality of waveguide parts disposed in the main body part and extending so as to connect the first end and the second end; and
      a first fixing component configured to retain one end of each of the plurality of waveguide parts at the first end, wherein the first fixing component internally fixes the plurality of waveguide parts so that the plurality of waveguide parts are parallel to each other; and
   the optical element which includes a plurality of optical input/output (I/O) parts respectively having optical axes that are parallel to each other,
   wherein the optical element is connected to the optical connecting member so that the plurality of waveguide parts of a first end face on the optical element side of the main body part and the plurality of optical I/O parts of the optical element face each other,
   wherein the optical element is a multi-core fiber in which a plurality of ores are surrounded by a common clad, and the multi-core fiber is retained by an optical ferrule which is fixed by being positioned relative to the optical connecting member by a guide member.

2. The optical connecting structure according to claim 1, wherein the first fixing component fixes the plurality of waveguide parts so that the plurality of waveguide parts are arrayed two-dimensionally at the first end.

3. The optical connecting structure according to claim 1, wherein the first fixing component includes a guide part for connecting to the optical element so that an optical axis of each of the plurality of optical I/O parts of the optical element and an optical axis of one end of each of the plurality of waveguide parts coincide with each other.

4. The optical connecting structure according to claim 1, further comprising:
   a second fixing component configured to retain other end of each of the plurality of waveguide parts at the second end,
   wherein the second fixing component internally fixes the plurality of waveguide parts so that the plurality of waveguide parts are parallel to each other.

5. The optical connecting structure according to claim 4, wherein the second fixing component fixes the plurality of waveguide parts so that the plurality of waveguide parts are arrayed one-dimensionally at the second end.

6. The optical connecting structure according to claim 4, wherein the second fixing component includes a guide part for connecting to the other optical component so that an optical axis of the other optical component and an optical axis of other end of each of the plurality of waveguide parts coincide with each other.

7. The optical connecting structure according to claim 1, wherein the first fixing component is a component for use in insert molding.

8. The optical connecting structure according to claim 1, wherein the waveguide parts are each formed of a single-core fiber having a cladding diameter which is equal to a distance between the plurality of optical I/O parts of the optical element.

9. The optical connecting structure according to claim 1, wherein an end face on the first end side has a substantial circular shape.

10. The optical connecting structure according to claim 1, wherein end faces of the waveguide parts are arrayed at regular intervals at the first end.

11. The optical connecting structure according to claim 1, wherein the plurality of optical I/O parts of the optical element are disposed in point symmetry around a predetermined rotating axis, and connected by adjusting a rotating angle so as to face the plurality of waveguide parts at the first end face.

12. The optical connecting structure according to claim 1, wherein a restrictive structure configured to restrict a rotation of the multi-core fiber is provided in the multi-core fiber and the optical ferrule.

13. The optical connecting structure according to claim 1,
   wherein the optical element is a receiving/emitting element in which a plurality of light receiving/emitting parts are arrayed two-dimensionally, and
   the optical connecting structure further comprises a light collection optical system configured to optically connect the plurality of light receiving/emitting parts of the receiving/emitting element to the plurality of waveguide parts, respectively.

14. An optical connecting structure, comprising:
   an optical connecting member configured to connect an optical element to other optical component, the optical connecting member comprising,
      a main body part having a first end on the optical element side and a second end on the other optical component side;

a plurality of waveguide parts disposed in the main body part and extending so as to connect the first end and the second end; and the optical element which includes a plurality of optical input/output (I/O) parts respectively having optical axes that are parallel to each other, wherein the plurality of waveguide parts are arrayed so as to correspond to an array of the plurality of optical I/O parts and respectively have straight-line portions which are parallel to each other at the first end, wherein the optical element is connected to the optical connecting member so that the plurality of waveguide parts of a first end face on the optical element side of the main body part and the plurality of optical I/O parts of the optical element face each other, and wherein the optical element is a multi-core fiber in which a plurality of cores are surrounded by a common clad, and the multi-core fiber is retained by an optical ferrule which is fixed by being positioned relative to the optical connecting member by a guide member.

15. An optical connecting member for connecting a multi-core fiber having a plurality of cores to a plurality of single-core fibers, the optical connecting member comprising, a main body part including a first end face which is connected to an end face of the multi-core fiber, a second end face which is diverged to the plurality of single-core fibers, and a plurality of waveguide parts which extend so as to connect the first end face and the second end face;

wherein each of the plurality of waveguide parts is a straight-line portion in which at least an end connected with the first end face is orthogonal to the first end face, and the multi-core fiber is retained by an optical ferrule to be fixed by being positioned relative to the optical connecting member of the first end face by a guide member.

* * * * *